US007264346B2

(12) United States Patent
Nishino et al.

(10) Patent No.: US 7,264,346 B2
(45) Date of Patent: Sep. 4, 2007

(54) INKJET PRINTER USING ULTRAVIOLET CURE INK

(75) Inventors: Satoshi Nishino, Sayama (JP); Katuichi Kawabata, Yokohama (JP); Atsushi Nakajima, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 316 days.

(21) Appl. No.: 10/884,903

(22) Filed: Jul. 6, 2004

(65) Prior Publication Data

US 2005/0012778 A1 Jan. 20, 2005

(30) Foreign Application Priority Data

| | | | |
|---|---|---|---|
| Jul. 15, 2003 | (JP) | ............................. | 2003-196979 |
| Jul. 24, 2003 | (JP) | ............................. | 2003-201175 |
| May 20, 2004 | (JP) | ............................. | 2004-150676 |
| Jun. 16, 2004 | (JP) | ............................. | 2004-178161 |

(51) Int. Cl.
*B41J 2/01* (2006.01)
*G01D 11/00* (2006.01)

(52) U.S. Cl. ....................................... 347/102; 347/100

(58) Field of Classification Search .................. 347/22, 347/29, 30, 33, 45, 54, 56, 67, 68, 100, 102, 347/106

See application file for complete search history.

(56) References Cited

U.S. PATENT DOCUMENTS

| | | | | |
|---|---|---|---|---|
| 5,530,461 | A * | 6/1996 | Sakuma | 347/23 |
| 6,092,890 | A * | 7/2000 | Wen et al. | 347/101 |
| 6,578,958 | B2 * | 6/2003 | Gotoh et al. | 347/100 |
| 6,726,317 | B2 | 4/2004 | Codos | 347/106 |
| 6,783,227 | B2 * | 8/2004 | Suzuki et al. | 347/102 |
| 6,790,273 | B2 * | 9/2004 | Mager | 106/287.13 |
| 2006/0209127 | A1 * | 9/2006 | Inoue | |

FOREIGN PATENT DOCUMENTS

| | | | | |
|---|---|---|---|---|
| EP | 1 172 213 | A2 | | 1/2002 |
| EP | 1 428 668 | A2 | | 6/2004 |
| EP | 04 10 3195 | | | 11/2004 |
| JP | 407304177 | A | * | 11/1995 |
| JP | 09254394 | | | 9/1997 |
| JP | 2003-94665 | | * | 4/2003 |
| WO | WO 2004/054810 | A1 | | 7/2004 |

* cited by examiner

*Primary Examiner*—Shih-Wen Hsieh
(74) *Attorney, Agent, or Firm*—Lucas & Mercanti, LLP

(57) ABSTRACT

An inkjet printer having: a recording head provided with an ink nozzle for ejecting ink to a recording medium, the ink being cured by exposure to ultraviolet rays; an ultraviolet irradiation apparatus for applying ultraviolet rays to the ink ejected on the recording medium; and a light trap arranged between the recording head and the ultraviolet irradiation apparatus to prevent the recording head from being exposed to reflected ultraviolet rays emitted from the ultraviolet irradiation apparatus, wherein the light trap has an inorganic ultraviolet ray absorbent coated layer arranged on an ultraviolet ray receiving surface.

40 Claims, 14 Drawing Sheets

FIG. 6

| MEASURED AT 350 to 360nm | ALUMITE (BLACK) | ALUMITE (BLACK) + UV | HARD ALUMITE (BLACK) | HARD ALUMITE (BLACK) + UV | DIE-CAST |
|---|---|---|---|---|---|
| TOTAL REFLECTION | 6.5% | 5.4% | 6.3% | 5.3% | 10% or MORE |
| REGULAR REFLECTION CUTTING-OUT | 5.2% | 0.7% | 5.5% | 0.8% | 10% or MORE |

INKJET PRINTER USING ULTRAVIOLET CURE INK

BACKGROUND OF THE INVENTION

The present invention relates to an inkjet printer and, in particular, to an inkjet printer using ink that is cured when exposed to ultraviolet rays.

In recent years, inkjet recording method has been employed in the field of special printing for photographs, various types of prints, markings and color filters for its capability of creating an image more simply and inexpensively than the gravure printing method. In the inkjet recording method, in particular, excellent image quality comparable to that of a silver halide photograph can be provided by a combination among: an inkjet printer based on the ink-jet recording method capable of ejecting and controlling minute dots; ink characterized by improved color reproduction area, durability and ejection properties; and special paper characterized by drastic improvement in ink absorbency, color developing properties of the coloring material and surface gloss.

The prior art inkjet printer is based on a line method where image recording is performed by the ink ejected from the line head where a plurality of ink outlets arranged in the scanning direction orthogonal to the transport direction are formed on the recording medium transported in the direction of transport; and a serial method where the recording head mounted on a carriage is moved in the scanning direction and ink is ejected from the ink outlet of the recording head during the traveling of the recording head, whereby an image is recorded.

Further, the inkjet printer can be classified according to the type of ink. To be more specific, the prior art ink-jet printer is available in a phase-change inkjet method where solid wax ink is used in the room temperature; a solvent based inkjet method using ink mainly consisting of a quick-dry organic solvent; and an ultraviolet cure type ink-jet method using ultraviolet cure ink which is cured when exposed to ultraviolet rays. Among them, the ultraviolet cure type inkjet method is relatively odorless as compared with other recording methods, and allows recording on the recording medium that has no quick drying properties or high ink absorbency, in addition to special-purpose paper. (See Patent Document 1, for example).

Incidentally, the inkjet printer may fail to eject ink properly if ink is deposited on the nozzle surface of the recording head with ink outlets arranged thereon. Especially in the inkjet printer based on ultraviolet cure ink, ink is cured when exposed to ultraviolet rays. Ultraviolet rays are applied to the ink deposited on the nozzle surface of the recording head, and ink is cured, with the result that ink ejection failure occurs. Such a trouble occurs more frequently in the inkjet printer using ultraviolet cure ink than in inkjet printer using other methods.

To solve this problem in the prior art, a light trap consisting of a concave member opening toward the recording medium, for example, is arranged between the recording head and ultraviolet ray irradiation apparatus. This light trap receives the reflected light produced when the ultraviolet rays applied from the ultraviolet ray irradiation apparatus hits the recording medium or platen, whereby the reflected light is cut off and the recording head is prevented from being exposed to ultraviolet rays.

In the ultraviolet cure type inkjet printer, ink is deposited on the surface of the nozzle upper plate of the recording head where ink outlets are arranged. This makes it difficult to remove the ink by wiping the recording head thereafter, with the result that correct ink ejection operation fails. Further, if ultraviolet rays are applied to the ink inside the nozzle that is not ejecting ink, ink will be cured and the nozzle will be clogged with ink; this leads to a failure in restarting ink ejection. To solve this problem, water-shedding treatment for shedding ink to prevent it from being deposited is provided on the surface of the nozzle upper plate. (See Patent Document 2, for example). Further, idle ejecting has been performed frequently by interrupting the printing operation.

In addition, a technique has been disclosed to provide water-shedding treatment to the protection upper plate for protecting the nozzle upper plate. (See Patent Document 3, for example). A further technique is disclosed, in which a level difference is provided between the surface of the nozzle upper plate and that of the protection upper plate, thereby reducing the amount of light applied to the nozzle upper plate. (See Patent Document 4, for example). A still further technique is disclosed wherein the material used for water-shedding treatment is selected with reference to the sliding speed. (See Patent Document 5, for example).

[Patent Document 1] Official Gazette of Japanese Patent Tokkai 2001-310454

[Patent Document 2] Official Gazette of Japanese Patent 3188816

[Patent Document 3] Official Gazette of Japanese Patent 3457458

[Patent Document 4] Official Gazette of Japanese Patent Tokkai 2002-79666

[Patent Document 5] Official Gazette of Japanese Patent Tokkai 2003-266702

PROBLEMS TO BE SOLVED BY THE INVENTION

In the inkjet printer using ultraviolet cure ink, however, ink is cured when exposed to ultraviolet rays. Thus, ultraviolet rays are applied to the ink deposited on the nozzle surface of the recording head, causing the ink to be cured, with the result that ink ejection failure occurs. This trouble occurs more frequently in this type of ink-jet printer than in the inkjet printer based on other methods.

If there is excessive ink curing on the nozzle surface of such a recording head, there is a higher possibility of ink ejection failures caused by cured ink. Further, to prevent ejection failure from occurring due to cured ink, the head requires frequent maintenance, with the result that the capacity utilization of the inkjet printer will be reduced.

To avoid the aforementioned problem, it is also necessary to increase the size of the light trap by increasing the width between the recording device in the light trap and an ultraviolet irradiation apparatus or by increasing the height of the light trap, thereby ensuring that the nozzle surface of the recording head will not be exposed to reflected irregularly ultraviolet rays. This has led to the increased size of the apparatus.

In view of the prior art described above, the object of the present invention is to provide an inkjet printer capable of avoiding ink ejection failure by reducing the amount of ultraviolet rays applied to the recording head and hence the amount of ink to be cured, and reducing the size of the light trap, so that a compact printer can be created.

Further, in the inkjet printer using ultraviolet cure ink, ink is cured instantaneously when exposed to ultraviolet rays and is closely packed on the substrate. If ultraviolet rays are applied to the ink in the nozzle during suspension of the operation, ink thickens and cannot be ejected. Further, if ultraviolet rays are applied to the ink deposited on the surface of the nozzle upper plate, the ink will be cured. Thus, this inkjet printer has a higher possibility of causing ink ejection failures, than other types of ink-jet printer.

Thus, a second object of the present invention is to provide an inkjet printer capable of avoiding an ink ejection failure caused by deposition of ink on the nozzle surface, by reducing the amount of ultraviolet rays applied to the nozzle surface of the recording head and hence minimizing the amount of ink cured on the nozzle surface.

A third object of the present invention is to provide an inkjet printer capable of avoiding the trouble caused by deposition of ink on the nozzle upper plate surface, by reducing the amount of ultraviolet rays applied to the nozzle upper plate of the recording head and hence minimizing the amount of ink cured on the nozzle surface, and capable of avoiding intermittent ink ejection failure, by giving micro-vibration to the ink meniscus in the nozzle during suspension of the operation and hence preventing ink from thickening.

SUMMARY OF THE INVENTION

The features of the present invention for solving the aforementioned problem include:

(1) An inkjet printer comprising:

a recording head provided with ink outlets for ejecting ink to a recording medium, wherein the ink is cured by exposure to ultraviolet rays; and an ultraviolet irradiation apparatus for applying ultraviolet rays to the ink ejected on the recording medium;

wherein a light trap is arranged between the recording head and ultraviolet irradiation apparatus to prevent the recording head from being exposed to the reflected light applied from the ultraviolet irradiation apparatus; and the light trap has an inorganic ultraviolet ray absorbent coated layer arranged on the surface of receiving the ultraviolet rays.

According to the aforementioned feature (1), the light trap has an inorganic ultraviolet ray absorbent coated layer arranged on the surface of receiving the ultraviolet rays. When ultraviolet rays are applied to the surface of receiving the ultraviolet rays of the light trap, ultraviolet rays are absorbed by the inorganic ultraviolet ray absorbent coated layer, thereby preventing irregular reflection of ultraviolet rays between the light trap and recording medium or platen. Thus, the amount of ultraviolet rays applied to the nozzle surface of the recording head is reduced by preventing irregular reflection of ultraviolet rays, with the result that the recording head operation is stabilized, without ink ejection failure being caused by ink cured on the nozzle surface. This arrangement provides an inkjet printer characterized by a high degree of reliability and durability. Further, since the amount of ink cured on the nozzle surface of the recording head is reduced, the head maintenance frequency can be minimized, thereby enhancing the capacity utilization of the inkjet printer.

In addition, since the irregular reflection of ultraviolet rays can be prevented, there is no need, in the phase of designing the light trap, of worrying about the possibility of the nozzle surface of the recording head being exposed to ultraviolet rays. This allows the light trap to be downsized.

Thus, the carriage of the serial type inkjet printer, for example, can be downsized by the amount corresponding to the reduced portion of the light trap, and hence the ink-jet printer can be downsized. This also applies to the case of a line type inkjet printer; the inkjet printer can be downsized by the amount corresponding to the reduced portion of the light trap.

Moreover, to absorb the ultraviolet rays, the present invention incorporates a layer coated with inorganic ultraviolet ray absorbent, and therefore it is characterized by less volatilization or deterioration due to heat than a product using an organic ultraviolet ray absorbent, thereby ensuring a long-term stabilized effect in absorbing ultraviolet rays.

(11) An inkjet printer comprising:

a recording head provided with ink outlets for ejecting ink to a recording medium, wherein the ink is cured by exposure to ultraviolet rays; and an ultraviolet irradiation apparatus for applying ultraviolet rays to the ink ejected on the recording medium;

wherein the aforementioned nozzle surface has an inorganic ultraviolet ray absorbent coated layer and a water-shedding process layer arranged on the nozzle upper plate.

According to the aforementioned feature (11), the nozzle surface has an inorganic ultraviolet ray absorbent coated layer and a water-shedding process layer arranged on the nozzle upper plate. The water-shedding process layer minimizes deposition of ink on the nozzle surface; and at the same time, when ultraviolet rays are applied to the nozzle surface, they are absorbed by the inorganic ultraviolet ray absorbent coated layer, thereby avoiding irregular reflection ultraviolet rays between the recording head and recording head. This arrangement reduces the amount of ultraviolet rays to be applied to the nozzle surface of the recording head, thereby minimizing the amount of ink cured on the ink surface, and hence avoiding ink ejection failure resulting from the deposition of ink on the nozzle surface.

Especially, the present invention is provided with the coated layer using the inorganic ultraviolet ray absorbent in order to absorb ultraviolet rays, and therefore this invention is characterized by less volatilization or deterioration due to heat than a product using an organic ultraviolet ray absorbent, thereby ensuring a long-term stabilized effect.

Moreover, when ink is ultraviolet cure ink based on cation polymer including a cation polymerized compound, cation polymerized ink is highly sensitive, and therefore is cured when exposed to a low level of ultraviolet rays. However, the present invention cuts down the amount of ultraviolet rays applied to the nozzle surface, and ensures effective prevention of cation polymerized ink from being deposited on the nozzle surface.

(21) An inkjet printer comprising:

a recording head provided with ink outlets for ejecting ink to a recording medium, wherein the ink is cured by exposure to ultraviolet rays; and an ultraviolet irradiation apparatus for applying ultraviolet rays to the ink ejected on the recording medium;

wherein the critical surface tension on the surface of the nozzle upper plate is lower than the surface tension of the ink, and ultraviolet ray absorbency index is 80% or more.

According to the aforementioned feature (21), the critical surface tension on the surface of the nozzle upper plate is lower than the surface tension of the ink, and therefore ink will be repelled even if ink contacts the nozzle upper plate. This arrangement prevents ink from remaining on the surface of the nozzle upper plate, and hence avoids ink deposition and ink ejection failure. Further, the material of the surface of the nozzle upper plate is selected based on the critical surface tension, and this ensures easier selection than when the water-shedding material is selected according to sliding speed.

Further, since the ultraviolet ray absorbency index is 80% or more; thus, if ultraviolet rays get inside, 80% or more will be absorbed. When the ultraviolet rays emitted from the ultraviolet irradiation apparatus enters the ink outlets, they are reflected at least once in most cases. The amount of ultraviolet rays having reached the ink outlet is absorbed by the reflecting surface, and is reduced to the extent to which ink is not cured. Accordingly, ink is not deposited on the surface of the nozzle upper plate, whereby curing of ink in the ink outlet and ink ejection failure can be avoided.

BRIEF DESCRIPTION OF THE DRAWINGS

FIG. 6 is a Table showing the result of light reflection factor measuring test conducted when various types of coated layers are provided on the ultraviolet ray receiving surface;

DETAILED DESCRIPTION OF THE PREFERRED EMBODIMENT

Figure 1:
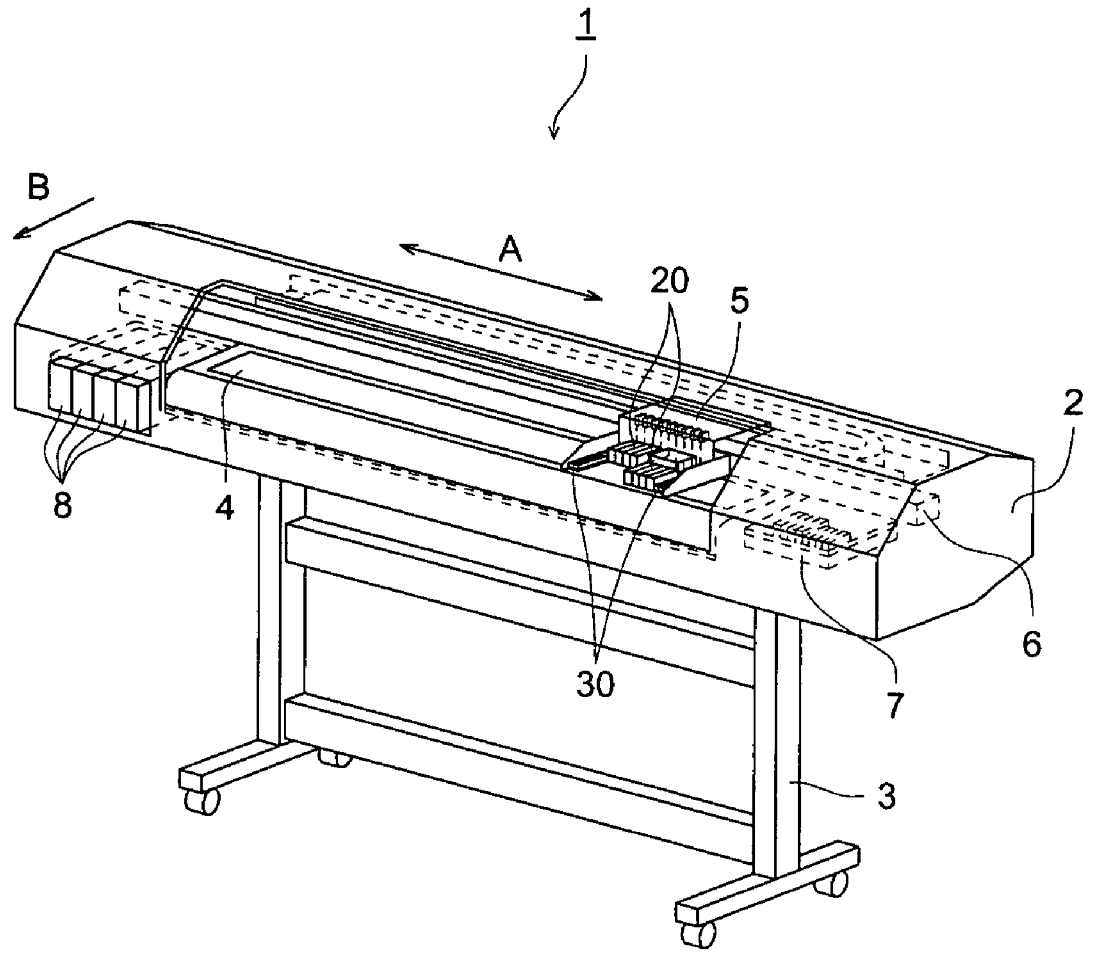
FIG. 1 is a perspective view representing an ink-jet printer as an embodiment of the present invention.

The aforementioned problems can be solved by the present invention characterized by the following features:

(2) The inkjet printer described in (1) wherein the light trap is provided with a black-color processed layer on the ultraviolet ray receiving surface thereof, and the aforementioned inorganic ultraviolet ray absorbent coated layer is further provided thereon.

According to the feature (2), light trap is provided with a black-color processed layer on the ultraviolet ray receiving surface thereof, and the aforementioned inorganic ultraviolet ray absorbent coated layer is further provided thereon; therefore, ultraviolet ray absorbing effect is further enhanced by the black-color processed layer.

The inkjet printer described in (3) wherein one black-color processed layer containing the inorganic ultraviolet ray absorbent is formed by using the processing solution formed by mixing the black-color processing solution for constituting the aforementioned black-color processed layer, with the inorganic ultraviolet ray absorbent constituting the aforementioned inorganic ultraviolet ray absorbent coated layer.

According to the feature (3), the inorganic ultraviolet ray absorbent coated layer and black-color processed layer are formed in one layer, the aforementioned effect can be obtained by simple and efficient configuration.

(4) The inkjet printer described in one of features (1) through (3) wherein the ultraviolet ray source of the aforementioned ultraviolet irradiation apparatus is any one of the low pressure mercury lamp, high pressure mercury lamp, metal halide lamp, hot-cathode tube, cold-cathode tube and LED.

According to the feature (4), the ultraviolet ray source of the aforementioned ultraviolet irradiation apparatus can be any one of the low pressure mercury lamp, high pressure mercury lamp, hot-cathode tube, cold-cathode tube and LED. This configuration provides the aforementioned effect in a concrete manner.

(5) The inkjet printer described in one of features (1) through (4), wherein the ultraviolet ray receiving surface has a plurality of projections and depressions.

(6) The inkjet printer described in feature (5), wherein the plurality of projections and depressions are shaped irregularly.

According to the features (5) or (6), reflection of ultraviolet rays from the ultraviolet ray receiving surface is diffused and the diffused reflection rays is effectively absorbed by the inorganic ultraviolet ray absorbent coated layer.

(12) The inkjet printer described in (11) wherein the nozzle surface is provided with a black-color processed layer on the nozzle upper plate, and the aforementioned inorganic ultraviolet ray absorbent coated layer and water-shedding process layer are further provided thereon.

According to the feature (12), the nozzle surface of the recording head is provided with a black-color processed layer on the nozzle upper plate, and the inorganic ultraviolet ray absorbent coated layer and water-shedding process layer are further provided thereon; therefore, ultraviolet ray absorbing effect is further enhanced by the black-color processed layer.

(13) The inkjet printer described in (11) or (12) wherein the inorganic ultraviolet ray absorbent coated layer and water-shedding process layer are formed in one layer by applying the coating agent made up by mixing the water-shedding processing solution for forming the water-shedding process layer, with the inorganic ultraviolet ray absorbent for forming the inorganic ultraviolet ray absorbent coated layer.

According to the feature (13), the inorganic ultraviolet ray absorbent coated layer and water-shedding process layer are formed in one layer; hence, the aforementioned effects can be by a simple and efficient arrangement.

(14) The inkjet printer described in any one of (11) through (13) wherein the nozzle upper plate is made up of aluminum plate or aluminum diecast plate.

According to the feature (14), the nozzle upper plate is made up of aluminum plate or aluminum diecast plate. This arrangement permits easy processing and reduction in product weight at the time of manufacturing. It also ensures uniform film thickness and uniform black coloring when providing black alumite treatment and black hard-alumite treatment suitable for a black-colored layer, and facilitates the formation and management of the black-colored layer.

(15) The inkjet printer described in any one of (11) through (14) wherein the ultraviolet ray source of the ultraviolet irradiation apparatus is any one of the low pressure mercury lamp, high pressure mercury lamp, metal halide lamp, hot-cathode tube, cold-cathode tube and LED.

According to the feature (15), the ultraviolet ray source of the aforementioned ultraviolet irradiation apparatus can be any one of the low pressure mercury lamp, high pressure mercury lamp, hot-cathode tube, cold-cathode tube and LED. This configuration provides the aforementioned effect in a concrete manner.

(22) An inkjet printer comprising:

a recording head further comprising:

a nozzle upper plate with ink outlets for ejecting ink to a recording medium, the ink being cured by exposure to ultraviolet rays, and a protection upper plate for protecting the nozzle upper plate; and an ultraviolet irradiation apparatus for applying ultraviolet rays to the ink ejected on the recording medium from the recording head;

wherein the critical surface tension on the surface of the protection upper plate is lower than the surface tension of the ink, and ultraviolet ray absorbency index is 80% or more.

According to the feature (22), the protection upper plate provides the same operations and advantages as those of the nozzle upper plate.

(23) The inkjet printer described in (22) wherein the critical surface tension on the surface of the nozzle upper plate is lower than the surface tension of the ink, and ultraviolet ray absorbency index is 80% or more.

According to the feature (23), the critical surface tensions on the surfaces of both the nozzle upper plate and protection upper plate are lower than the surface tension of the ink, and ultraviolet ray absorbency index is 80% or more. This arrangement provides a more effective way to avoid ink deposition and ink ejection failure.

(24) The inkjet printer described in (23) wherein the critical surface tension on the surface of at least one of the nozzle upper plate and protection upper plate does not exceed 15 mN/m.

The ink cured by exposure to ultraviolet rays (ultraviolet cure ink) is oil-based ink, whose surface tension is 25 through 35 mN/m. To put it another way, the critical surface tension must not exceed 25 mN/m in order to repel the ultraviolet cure ink. However, to repel ultraviolet cure ink more quickly and thoroughly, the critical surface tension is preferred to not be exceeding 15 mN/m. To be more specific, if the critical surface tension on the surface of at least one of the nozzle upper plate and protection upper plate does not exceed 15 mN/m, as described in (24), then the ink in contact with the surface can be repelled quickly and thoroughly.

(25) The inkjet printer described in (23) wherein at least one of the nozzle upper plate and protection upper plate surfaces is provided with an inorganic ultraviolet ray absorbent coated layer and water-shedding process layer arranged on the substrate.

According to the feature (25), at least one of the nozzle upper plate and protection upper plate surfaces is provided with an inorganic ultraviolet ray absorbent coated layer and water-shedding process layer arranged on the substrate. Thus, on at least one of the nozzle upper plate and protection upper plate surfaces, deposition of ink is minimized by the water-shedding process layer; and when exposed to ultraviolet rays, ultraviolet rays are absorbed by inorganic ultraviolet ray absorbent coated layer, with the result that irregular reflection between the recording head and recording medium is avoided. This arrangement reduces the amount of ultraviolet rays applied to the nozzle upper plate surface, and minimizes the deposition of ink cured on the nozzle upper plate surface and thickening of the ink inside the nozzle during the suspension of ejecting. Thus, this arrangement avoids ink deposition and ink ejection failure resulting from thickening of ink.

Especially, the present invention is provided with a coated layer using the inorganic ultraviolet ray absorbent, and is therefore characterized by less volatilization or deterioration due to heat than a product using an organic ultraviolet ray absorbent, thereby ensuring a long-term stabilized effect in absorbing ultraviolet rays.

Further, when ink is ultraviolet cure ink based on cation polymer including a cation polymerized compound, cation polymerized ink is highly sensitive, and therefore is cured when exposed to a low level of ultraviolet rays. However, the present invention cuts down the amount of ultraviolet rays applied to the nozzle surface, and ensures effective prevention of cation polymerized ink from being deposited on the nozzle surface.

(26) An inkjet printer wherein at least one of the nozzle upper plate and protection upper plate surfaces is provided with a black-color processed layer arranged on the substrate, and the inorganic ultraviolet ray absorbent coated layer and water-shedding process layer are further provided thereon.

According to the feature (26), at least one of the nozzle upper plate and protection upper plate surfaces is provided with a black-color processed layer arranged on the substrate, and the inorganic ultraviolet ray absorbent coated layer and water-shedding process layer are further provided thereon. This arrangement provides a more effective way of absorbing ultraviolet rays than the black-color processed layer arrangement.

(27) The inkjet printer described in any one of (24) through (26) wherein at least one of the nozzle upper plate and protection upper plate substrates is made up of aluminum plate or aluminum die-cast plate.

According to the feature (27), the substrate of the protection upper plate is made up of aluminum plate or aluminum diecast plate. This arrangement permits easy processing and reduction in product weight at the time of manufacturing. It also ensures uniform film thickness and uniform black coloring when providing black alumite treatment and black hard-alumite treatment suitable for a black-colored layer, and facilitates the formation and management of the black-colored layer.

(28) The inkjet printer described in (23) and (24) wherein the surface of the nozzle upper plate is provided with a water-shedding process layer arranged on the substrate thereof, and the surface of the protection upper plate is made of the material having an ultraviolet ray absorbency index of 80% or more.

According to the feature (28), the surface of the nozzle upper plate is provided with a water-shedding process layer arranged on the substrate thereof. On the surface of the nozzle upper plate, therefore, deposition of ink is minimized by the water-shedding process layer. Further, since the protection upper plate is made of the material having an ultraviolet ray absorbency index of 80% or more, it absorbs the ultraviolet rays having been reflected by the protection upper plate before being applied to the surface of the nozzle upper plate. This arrangement minimizes the amount of ultraviolet rays applied to the nozzle upper plate surface, and hence the deposition on ink and thickening of ink inside the nozzle during the suspension of ejecting. Thus, this arrangement avoids ink ejection failure resulting from deposition of ink on the nozzle upper plate surface.

(29) The inkjet printer described in any one of (21) through (28) wherein there is an interval of 1 mm or more without exceeding 4 mm between the nozzle upper plate surface and recording medium.

The flying distance of the ink ejected from the recording head is reduced as an interval between the nozzle upper plate surface and recording medium is shorter, whereby the influence of curved ink flying can be prevented, and the sharpness of an image is updated. However, if this interval is less than 1 mm and a foreign substance has deposited on the recording head, it may contact the recording medium and damage it. This may raise some problems. To solve these problems, the interval between the nozzle upper plate surface and recording medium is not less than 1 mm, thereby avoiding troubles resulting from deposited foreign substances.

In the meantime, the interval between the nozzle upper plate surface and recording medium exceeds 4 mm, the aforementioned image sharpness will be reduced, and the ultraviolet rays reflected by the recording medium surface will easily enter the ink outlet. If the interval between the nozzle upper plate surface and recording medium exceeds 4 mm, the number of reflections of the ultraviolet rays between the recording medium nozzle upper plate surface can be increased, and ultraviolet rays will be absorbed by the nozzle surface repeatedly before they reach the ink outlet, with the result that the amount of ultraviolet rays reaching the ink outlet is cut down.

To put it another way, if there is an interval of 1 mm or more without exceeding 4 mm between the nozzle upper plate surface and recording medium, as described in claim 9, it is possible to avoid the problems resulting from foreign substances and to diminish the amount of ultraviolet rays reaching the ink outlet.

(30) The inkjet printer described in any one of (21) through (29), wherein the ultraviolet ray source of the ultraviolet irradiation apparatus is any one of the low pressure mercury lamp, high pressure mercury lamp, metal halide lamp, hot-cathode tube, cold-cathode tube and LED.

According to the feature (30), the ultraviolet ray source of the aforementioned ultraviolet irradiation apparatus can be any one of the low pressure mercury lamp, high pressure mercury lamp, hot-cathode tube, cold-cathode tube and LED. This configuration provides the aforementioned effect in a concrete manner.

(31) The inkjet printer described in any one of (21) through (30), wherein the recording head comprises:

an ink flow path for leading the ink to the ink output; and a piezoelectric device for ejecting the ink from the ink flow path;

wherein the piezoelectric device causes micro-vibration of the ink meniscus on the ink outlet by the piezoelectric waveform that does not allow the ink to be ejected during the suspension of ink ejecting, so that the ink in the ink flow path is agitated.

The dot inkjet printer uses the image signal to repeat ink ejection and suspension, and therefore some nozzles have a long idling period while others have a short one, depending on the image. Ultraviolet rays applied to the ink in the idle nozzle cannot be thoroughly avoided, even if the nozzle upper plate and protection upper plate surfaces has an ultraviolet ray absorbency index of 80% or more. Accordingly, if the idling time is long, much ink in the nozzle will be thickened. In the prior art, curing of ink in the nozzle has been avoided by idle ejecting of ink on a periodic basis. However, the printing speed is reduced by the time corresponding to idling ink ejecting, and ink has been wasted. By contrast, if the piezoelectric device causes micro-vibration of the ink meniscus on the ink outlet by the piezoelectric waveform that does not allow the ink to be ejected during the suspension of ink ejecting, so that the ink in the ink flow path is agitated, as described in claim 11, then curing of ink in the nozzle can be prevented at the time of suspension, even if ink is not subjected to frequent idle ejecting.

(32) A recording head equipped with a nozzle upper plate having ink outlets for ejecting ink to a recording medium, the ink being cured by exposure to ultraviolet rays, wherein the critical surface tension on the surface of the nozzle upper plate is lower than the surface tension of the ink, and ultraviolet ray absorbency index is 80% or more.

The feature (32) provides the same operations and advantages as those described in claim 1.

(33) A recording head comprising:

a nozzle upper plate having ink outlets for ejecting ink to a recording medium, the ink being cured by exposure to ultraviolet rays; and a protection upper plate for protecting the nozzle upper plate;

wherein the critical surface tension on the surface of the protection upper plate is lower than the surface tension of the ink, and ultraviolet ray absorbency index is 80% or more.

The feature (33) provides the same operations and advantages as those described in (22).

(34) The recording head described in (33) wherein the critical surface tension on the surface of the nozzle upper plate is lower than the surface tension of the ink, and ultraviolet ray absorbency index is 80% or more.

The feature (34) provides the same operations and advantages as those described in (23).

(35) The recording head described in (34) wherein the critical surface tension on the surface of at least one of the nozzle upper plate and protection upper plate does not exceed 15 mN/m.

The feature (35) provides the same operations and advantages as those described in (24).

(36) The recording head described in (34) or (35) wherein at least one of the nozzle upper plate and protection upper plate surfaces is provided with an inorganic ultraviolet ray absorbent coated layer and water-shedding process layer arranged on the substrate.

The feature (36) provides the same operations and advantages as those described in (25).

(37) The recording head described in (36) wherein at least one of the nozzle upper plate and protection upper plate surfaces is provided with an black-color processed layer arranged on the substrate, and the inorganic ultraviolet ray absorbent coated layer and water-shedding process layer are further provided thereon.

The feature (37) provides the same operations and advantages as those described in claim 6.

(38) The recording head described in any one of the (35) through (37) wherein at least one of the nozzle upper plate and protection upper plate substrates is made up of aluminum plate or aluminum diecast plate.

The feature (38) provides the same operations and advantages as those described in (27).

(39) The recording head described in (34) or (35) wherein the surface of the nozzle upper plate is provided with a water-shedding process layer arranged on the substrate thereof, and the surface of the protection upper plate is made of the material having an ultraviolet ray absorbency index of 80% or more.

The feature (39) provides the same operations and advantages as those described in claim 8.

(40) The recording head described in any one of (32) through (39) wherein there is an interval of 1 mm or more without exceeding 4 mm between the nozzle upper plate surface and recording medium.

The feature (40) provides the same operations and advantages as those described in (29).

(41) The recording head described in any one of (32) through (40) comprising:

an ink flow path for leading the ink to the ink output; and a piezoelectric device for ejecting the ink from the ink flow path;

wherein the piezoelectric device causes micro-vibration of the ink meniscus on the ink outlet by the piezoelectric waveform that does not allow the ink to be ejected during the suspension of ink ejecting, so that the ink in the ink flow path is agitated.

The feature (41) provides the same operations and advantages as those described in (31).

Embodiment 1

Referring to the drawings, the following describes the embodiment 1 of the inkjet printer according to the present invention in details, without the present invention being restricted to the illustrated examples:

FIG. 1 is a perspective view representing an ink-jet printer 1 based on serial image recording method.

As shown in FIG. 1, the inkjet printer 1 contains a printer proper 2 and a support base 3 for supporting the printer proper 2 from below. A flat-shaped platen 4 longer in the longitudinal direction is installed inside the printer proper 2, and supports a web-shaped recording medium 99 (FIG. 5) from below in a flat manner.

FIG. 1 does not show the recording medium 99 with an image recorded thereon. The recording medium 99 is fed inside from the inlet on the back of the printer proper 2. Supported by the platen 4, the recording medium 99 is fed through the printer proper 2 from the back to the front by a transport mechanism (not illustrated) arranged inside the printer proper 2, and is brought out of the printer proper 2. To put it another way, the recording medium 99 is fed by the transport mechanism in the transport direction B so as to pass through the printer proper 2.

The transport mechanism is provided with a transport motor and a transport roller (not illustrated), for example, and the recording medium 99 is fed when the transport roller is rotated by the transport motor. When image recording operation is suspended, the transport mechanism repeats transport and stop of the recording medium 99, synchronously with the operation of a carriage 5 to be described later, so as to transport the recording medium 99 intermittently.

A guide member 6 extending inside the printer proper 2 in the longitudinal direction is arranged above the platen 4. The carriage 5 is supported by the guide member 6 and is guided by the guide member 6 to move freely in the longitudinal direction. Further, the drive mechanism (not illustrated) moves the carriage 5 along the guide member 6. The following description assumes that the scanning direction A refers to the direction in which the carriage 5 moves.

The maintenance unit 7 is mounted on the right of the platen 4 in the scanning direction A to provide maintenance of a plurality of recording heads 20 with the carriage 5 mounted thereon. The maintenance unit 7 is located below the carriage 5, within the traveling range of the carriage 5.

A plurality of ink tanks 8 for storing ink are arranged on the left of the platen 4 in the scanning direction A. Colors of ink used in the inkjet printer 1 consist of yellow (Y), magenta (M), cyan (C) and black (K). Further, white (W), light yellow (LY), light magenta (LM), light cyan (LC) and light black (LK) are also provided. Each of the ink tanks 8 stores the ink of one of these colors. Basically, ink of a different color is stored in each ink tank 8. Ink of the same color may be stored in two or more ink tanks 8.

The following describes the "ink" used in the present embodiment.

The ink used in the present embodiment is the ultraviolet cure ink that is cured when exposed to the ultraviolet rays as light, and contains the main components consisting of at least polymerized compounds (including the known polymerized compounds), photo-initiator and coloring material.

The ultraviolet cure ink can be broadly classified into two categories; radical polymerized ink containing a radical polymerized compound, and cation polymerized ink containing cation polymerized compound. Both categories of ink can be used in the present embodiment. Moreover, hybrid ink made up of a combination of radical polymerized ink and cation polymerized ink may be used in the present invention. In this case, cation polymerized ink provides a higher sensitivity to the ultraviolet rays than radical polymerized ink, and has a less damaging effect of oxygen on polymerization reaction. This makes it possible to diminish the level illumination required for ink curing. On the aforementioned ground, cation polymerized ultraviolet cure ink will be used in the present embodiment.

The following describes the recording medium 99 used in the inkjet printer 1:

The recording medium 99 applicable for use in the inkjet printer 1 includes the medium composed of such paper as plain paper, recycled paper and calendered paper that are applicable to a commonly used normal inkjet printer, as well as various fabrics, various non-woven fabrics, resin, metal and glass. For the form of the recording medium 99, a roll sheet, cut sheet and cardboard can be used.

Further, the recording medium 99 used in the present embodiment can include various types of paper with its surface coated by resin, films containing pigments, foamed films and other known opaque recording media.

Figure 2:
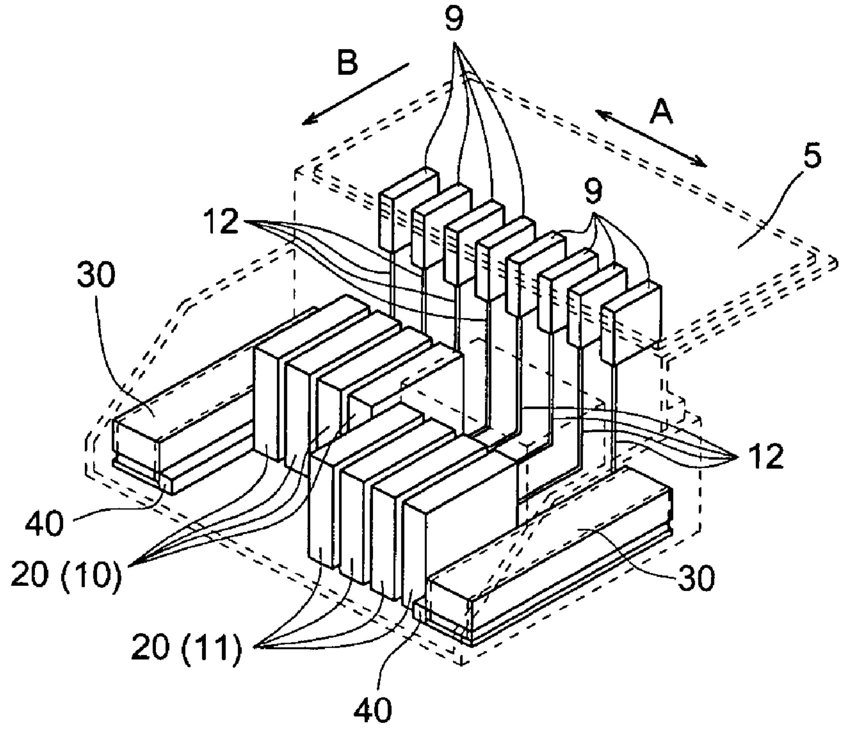
FIG. 2 is a perspective view representing a carriage of the inkjet printer of FIG. 1.
Figure 3:
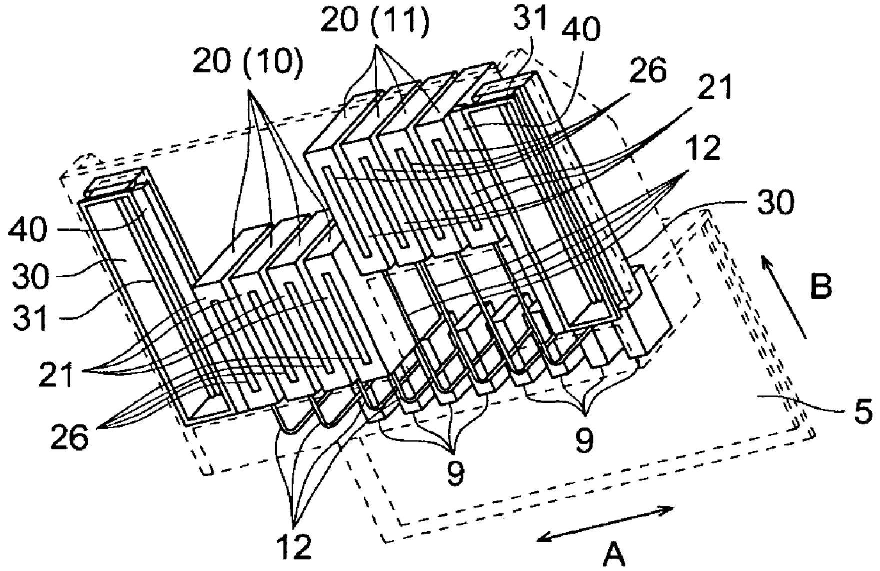
FIG. 3 is a perspective view representing the carriage of the inkjet printer of FIG. 1, as viewed from the direction opposite to the perspective view of FIG. 2.

The following describes the details of the carriage 5:

FIG. 2 is a perspective view representing a carriage 5 when viewed in approximately the same direction as that in FIG. 1. FIG. 3 is a perspective view representing the carriage 5 in an upward slanting direction viewed from the lower right in FIG. 1. In FIGS. 2 and 3, the carriage 5 is shown by a dashed line and the carriage 5 is shown in perspective.

As shown in FIGS. 2 and 3, eight sub-tanks 9 are arranged on the back of the carriage 5 in a line in the scanning direction A. Ink of each color is supplied from the ink tank 8 and is stored in the sub-tanks temporarily.

Eight recording heads 20 are mounted on the front of the carriage 5 and are separated into two sets 10 and 11, each consisting of four. Four recording heads 20 on each of sets 10 and 11 are arranged in a line in the scanning direction A. The set 10 is arranged on the left side of the other set 11 and on the upstream side in the traveling direction B. A supply tube 12 communicates each of the recording heads 20 with the one of the sub-tanks 9, and ink of each color is supplied to the recording heads 20 from the sub-tanks 9. In the present embodiment, the sub-tanks 9 are located at a position higher than the recording heads 20, so that negative pressure with respect to the nozzle is not produced. As a result, ink will run down from the nozzle surface 21 of the recording head 20. To prevent this, a pump (not illustrated) is provided in the present embodiment to reduce pressure and provide control so that a constant pressure is applied to the nozzle.

Each of the recording heads 20 is designed in an approximately rectangular parallelopiped shape, and is arranged so that the longitudinal direction will be parallel to the traveling direction B. Each of the recording heads 20 has a lower surface serving as a nozzle surface 21 so as to be opposite to the recording medium 99 transported on the platen 4. On the nozzle surface 21 of each of the recording heads 20, a plurality of ink outlets for ejecting ink are arranged in a line (queue) in the traveling direction B, thereby forming a nozzle train 26. Each of the recording heads 20 is equipped with a piezoelectric device for applying pressure to the internal ink by deformation, a heating device for applying pressure to internal ink by causing film boiling of internal ink, and other devices for applying pressure to the internal ink. Means are provided to ensure that ink particles are ejected separately from each ink outlet by the operation of these devices.

In the present embodiment, ink of any one of Y, M, C and K colors is ejected from one recording head 20, and ink of the color different for each of recording heads 20 is ejected in each of the sets 10 and 11.

An ultraviolet irradiation apparatuses 30 for irradiating ultraviolet rays is mounted on each of the right and left of the carriage 5. One of these ultraviolet irradiation apparatuses 30 is located on the left side of the recording head 20 which is located on the left end, while the other ultraviolet irradiation apparatuses 30 is located on the right side of the recording head 20 which is located on the right end. One or more ultraviolet ray sources 31 are located in the closed concave portion of the ultraviolet irradiation apparatus 30.

The ultraviolet ray source 31 applies ultraviolet rays from the centerline along the longitudinal direction. At least any one of the low pressure mercury lamp, high pressure mercury lamp, metal halide lamp, hot-cathode tube, cold-cathode tube and LED is used as the ultraviolet ray source 31.

Between the ultraviolet irradiation apparatus 30 and recording heads 20 adjacent to the ultraviolet irradiation apparatus 30, light traps 40 are provided to prevent the ultraviolet rays, emitted from the ultraviolet irradiation apparatus 30 and reflected by the recording medium 99 and platen 4, from hitting the recording heads 20.

As shown in FIGS. 2 and 3, one of the light traps 40 is loaded with a carriage 5 on the left side of the recording heads 20 located on the left end, while the other light traps 40 is loaded with a carriage 5 on the right side of the recording heads 20 located on the right end.

The light trap 40 of the present embodiment is equipped with a long light trap proper 42 extending in the traveling direction B, and its length equal to or greater than the length of the ultraviolet irradiation apparatus 30 in the traveling direction B. Further, the light trap proper 42 is a concave member opened toward the recording medium 99. For example, the opened edge is arranged to be approximately parallel with the recording medium 99. The internal surface of the concave member serves as an ultraviolet ray receiving surface 41 of the light trap 40 for receiving the ultraviolet rays emitted from the ultraviolet irradiation apparatus 30 and reflected by the recording medium 99 and platen 4. The light trap proper 42 can be formed in any shape if it allows the ultraviolet rays to be launched to the ultraviolet ray receiving surface 41 of the light trap 40.

Figure 4:
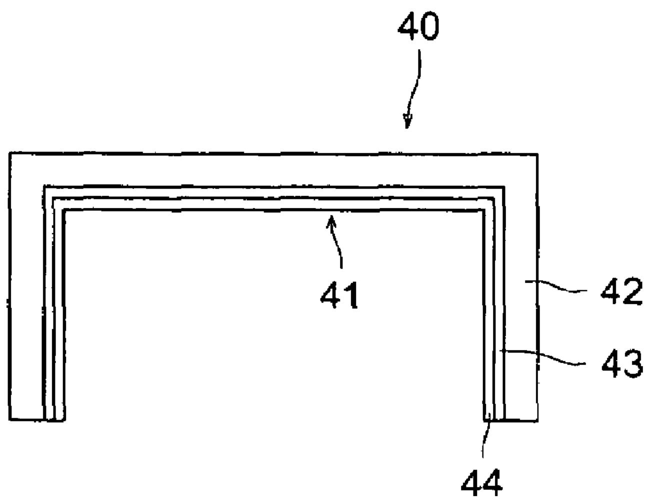
FIG. 4 is a drawing schematically representing the ultraviolet ray receiving surface of a light trap.

As shown in FIG. 4, in the present embodiment, the ultraviolet ray receiving surface 41 of the light trap 40 is equipped with a black-color processed layer 43 and an inorganic ultraviolet ray absorbent coated layer 44 arranged on the light trap proper 42 in that order as counted from the lowest layer.

In the present embodiment, the light trap proper 42 is made of a diecast plate. The light trap proper 42 is not restricted to one composed of the diecast plate; it can be made of an appropriate member, for example, a member made of appropriate resin or metal.

The black-color processed layer 43 is a layer provided with black coloring on the light trap proper 42 to minimize reflection of ultraviolet rays. In the present embodiment, it is a ceramic layer treated with a black-colored hard-alumite processed liquid. However, It should be noted that the black-color processed layer 43 is not restricted thereto; for example, a ceramic layer treated with a black-colored alumite processed liquid can be used.

The inorganic ultraviolet ray absorbent coated layer 44 is a layer coated with inorganic ultraviolet ray absorbent. The inorganic ultraviolet ray absorbent to be used is preferred to be the one that absorbs the ultraviolet rays having wavelengths of about 250 nm, 359 nm and 450 nm. To put it more specifically, the preferred layer includes the one coated with cerium oxide based inorganic ultraviolet ray absorbent such as Niedral (trade name; made by TAKI KAGAKU Co., Ltd.).

In the present embodiment, the black-color processed layer 43 and inorganic ultraviolet ray absorbent coated layer 44 are formed separately from each other. By contrast, "it is also possible to make such arrangements that the inorganic ultraviolet ray absorbent coated layer and black-color processed layer are formed in one layer by performing hard-alumite processing or alumite processing, using the solution; wherein this solution is prepared by mixing the inorganic ultraviolet ray absorbent forming the inorganic ultraviolet ray absorbent coated layer 44, with the hard alumite processing solution and alumite processing solution forming the black-color processed layer 43." This arrangement provides simple and efficient configuration.

The following describes the operation of the ink-jet printer 1 characterized by the aforementioned configuration:

An operator sets the recording medium 99 on the ink-jet printer 1 and turns on the power of the inkjet printer 1. Then the ultraviolet ray source 31 emits light and ultraviolet rays are applied to the recording medium 99 where ink particles are applied.

While the ultraviolet ray source 31 is emitting light, the transport mechanism transports the recording medium 99 in the traveling direction B, where the transport mechanism repeats transport and stop of the recording medium 99 so as to transport the recording medium 99 intermittently.

While the transport is stopped in the intermittent transport mode, the carriage 5 goes in the scanning direction A and returns, or performs a reciprocal movement. With the movement of the carriage 5, the recording heads 20 also move integrally therewith. During the movement of these recording heads 20, ink particles are ejected to the recording medium 99 from each ink outlet of the nozzle surface 21. The flying ink particles hits the recording medium 99 at rest. Here when the carriage 5 performs a reciprocating motion toward the rightward front in the scanning direction A of FIG. 1, the recording head 20 of the set 10 ejects ink; whereas the recording head 20 of the set 11 ejected ink when the carriage 5 performs reciprocating motions toward the leftward back in the scanning direction A of FIG. 1.

With the movement of the carriage 5, two ultraviolet irradiation apparatuses 30 also move integrally therewith. When the ultraviolet irradiation apparatus 30 passes over the ink hitting the recording medium 99, ultraviolet rays emitted from the ultraviolet ray sources 31 enters ink on the recording medium 99, thereby causing the ink to be cure.

When the carriage 5 goes toward the rightward front in the scanning direction A of FIG. 1, the ink particles ejected from the recording head 20 of the set 10 ejects ink; whereas the recording head 20 of the set 11 is cured by the ultraviolet rays emitted from the ultraviolet ray sources 31 of the ultraviolet irradiation apparatus 30. In this case, an image is recorded on the recording medium 99 in the same direction where the carriage 5 moves. Namely, the ultraviolet ray sources 31 of the ultraviolet irradiation apparatus 30 located on the leftward back in FIG. 2 are arranged downstream from the recording heads 20 of the set 10 in the direction of recording. When the carriage 5 returns toward the leftward back in the scanning direction A, the ink particles ejected by the recording heads 20 of the set 11 are cured by the ultraviolet rays emitted from the ultraviolet ray sources 31 of the ultraviolet irradiation apparatus 30 located on the rightward front in FIG. 1. In this case, recording is carried out in the direction where the carriage 5 travels. Namely, the ultraviolet ray sources 31 of the ultraviolet irradiation apparatus 30 on the rightward front in FIG. 1 are located downstream from the recording head 20 of the set 11 in the direction of recording.

As described above, the transport mechanism feeds the recording medium 99 intermittently while ultraviolet rays are emitted from a plurality of ultraviolet ray sources 31. At the same time, the reciprocating motion of the carriage 5 is repeated and the recording head 20 ejects ink as appropriate, during the traveling of the carriage 5, whereby an image is formed on the recording medium 99.

Figure 5:
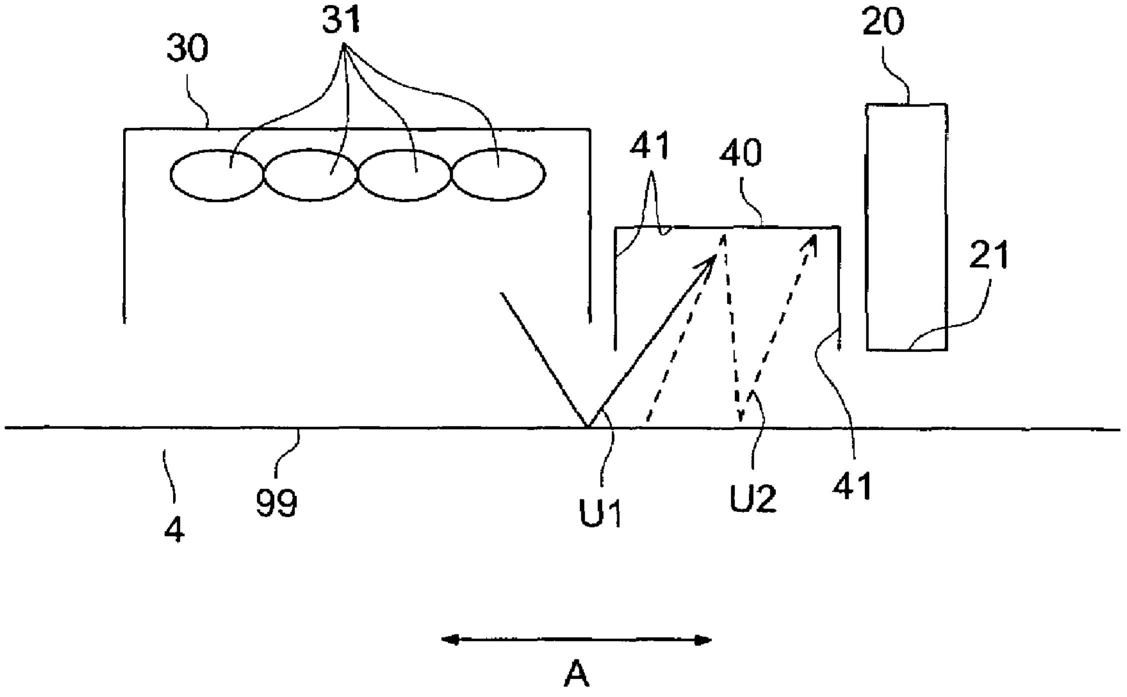
FIG. 5 is a drawing representing a light trap exposed to the ultraviolet rays from the ultraviolet irradiation apparatus.

In this case, the ultraviolet rays emitted from the ultraviolet ray source 31 of the ultraviolet irradiation apparatus 30 may be applied to the recording medium 99 or platen 4 as indicated by arrow-marks U1 and U2 in FIG. 5, and may be reflected thereby. A light trap 40 is provided to ensure that this reflected light of ultraviolet rays is not applied to the nozzle surface 21 of the recording head 20.

According to the present invention, ultraviolet rays emitted at an angle shown by the arrow-mark U1 are absorbed by the inorganic ultraviolet ray absorbent coated layer 44 of the ultraviolet ray receiving surface 41 of the light trap 40. As described above, the ultraviolet rays are absorbed by the inorganic ultraviolet ray absorbent coated layer 44, and therefore, it is possible to eliminate the ultraviolet rays that are irregularly reflected between the ultraviolet ray receiving surface 41 of the light trap 40 and the recording medium 99/platen 4. Further in the present embodiment, a black-color processed layer 43 is formed to avoid irregular reflection of the ultraviolet rays more effectively. As a result, this arrangement reduces the amount of ultraviolet rays applied to the nozzle surface 21 of the recording heads 20 and reduces the curing of ink on the nozzle surface 21, thereby avoiding ink ejection failure. At the same time, there is no need, in the phase of designing the light trap, of worrying about the possibility of the nozzle surface 21 of the recording head 20 being exposed to ultraviolet rays because of irregular reflection. This allows the light trap 40 to be downsized.

Referring to the Table of FIG. 6, the following describes the test of measuring the light reflection factor when the ultraviolet ray receiving surface 41 of the light trap 40 is provided with various types of coated layers:

In this test, the reflection factor was measured when ultraviolet rays having wavelengths of 350 through 360 were applied to:

an aluminum diecast plate as a light trap proper 42 provided with black-color alumite processing as a black-color processed layer 43 (described as "alumite (black)");

an aluminum diecast plate as a light trap proper 42 provided with black-color processing as black-color processed layer 43, which is further coated with inorganic ultraviolet ray absorbent as inorganic ultraviolet ray absorbent coated layer 44 (described as "alumite (black)+UV");

an aluminum diecast plate as a light trap proper 42 provided with black-color hard-alumite processing as black-color processed layer 43 (described as "hard alumite (black)");

an aluminum diecast plate as a light trap proper 42 provided with hard-alumite processing as black-color processed layer 43, which is coated with inorganic ultraviolet ray absorbent as inorganic ultraviolet ray absorbent coated layer 44 (described as "hard alumite (black)+UV"); and an aluminum diecast plate as a light trap proper 42 alone (described as "diecast"). Reflection factor was measured by two methods; total reflection measurement method and measurement method with regular reflection cut off. The measuring instrument used in this test was a U-330 Spectrophotometer (150-mm diameter integrating sphere photometer) by Hitachi Limited.

As shown in the Table of FIG. 6, in the total reflection measurement method, there was almost no difference except in the case of the aluminum diecast plate alone. However, in the measurement with regular reflection cut off, the reflection factor was close to zero when the inorganic ultraviolet ray absorbent coated layer was applied. A big difference was observed as compared to the one without the inorganic ultraviolet ray absorbent coated thereon. In the present invention, it has become apparent from the above that ultraviolet rays are absorbed and irregular reflection of ultraviolet rays can be prevented by providing the ultraviolet ray receiving surface of the light trap with the inorganic ultraviolet ray absorbent coated layer.

As a result, as described above, in the inkjet printer according to the present embodiment, the light trap has its ultraviolet ray receiving surface provided with an inorganic ultraviolet ray absorbent coated layer. Thus, when the ultraviolet ray receiving surface is exposed to ultraviolet rays, the ultraviolet rays are absorbed by the inorganic ultraviolet ray absorbent coated layer, thereby avoiding irregular reflection of the ultraviolet rays between the light trap and recording medium/platen. The amount of ultraviolet rays applied to the nozzle surface of the recording head can be reduced by avoiding irregular reflection of the ultraviolet rays, and the stable operation of the recording head can be ensured without ink ejection failure resulting from ink cured on the nozzle surface. This arrangement provides an inkjet printer noted for high degree of reliability and durability. Further, since curing of ink on the nozzle surface of the recording head is reduced, the need of head maintenance will be minimized, thereby contributing to improved capacity utilization of the ink-jet printer.

Further, since the irregular reflection of ultraviolet rays can be prevented, there is no need, in the phase of designing the light trap, of worrying about the possibility of the nozzle surface of the recording head being exposed to ultraviolet rays because of irregular reflection. This allows the light trap to be downsized by the corresponding amount.

Thus, the carriage of the serial type inkjet printer, for example, can be downsized by the amount corresponding to the reduced portion of the light trap, and hence the ink-jet printer can be downsized. This also applies to the case of a line type inkjet printer; the inkjet printer can be downsized by the amount corresponding to the reduced portion of the light trap.

Moreover, to absorb the ultraviolet rays, the present embodiment incorporates a layer coated with inorganic ultraviolet ray absorbent, and therefore it is characterized by less volatilization or deterioration due to heat than a product using an organic ultraviolet ray absorbent, thereby ensuring a long-term stabilized effect in absorbing ultraviolet rays.

In the present embodiment, the light trap is provided with a black-color processed layer on the ultraviolet ray receiving surface thereof, and the aforementioned inorganic ultraviolet ray absorbent coated layer is further provided thereon; therefore, ultraviolet ray absorbing effect is further enhanced by the black-color processed layer.

Figure 7:
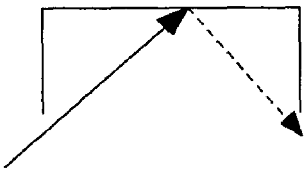
FIGS. 7(*a*) through (*c*) are drawings schematically showing the ultraviolet rays reflected on the ultraviolet ray receiving surface of the light trap.
Figure 7:
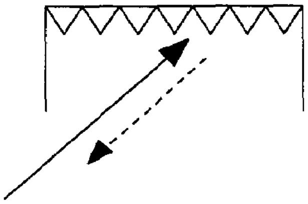
Figure 7:
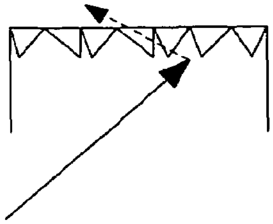

In the present embodiment, the above description refers to the case where the ultraviolet ray receiving surface of the light trap is made up of a flat surface. It is more preferred when the light receiving surface is composed of a plurality of projections and depressions, as shown in FIGS. 7(*b*) and (*c*). To put it another way, if the light receiving surface is flat as shown in FIG. 7(*a*), much of the light is reflected by the light receiving surface in regular reflection. However, if there are projections and depressions on the light receiving surface, the light in regular reflection is decreased, and the reflected light is diffused.

Figure 8:
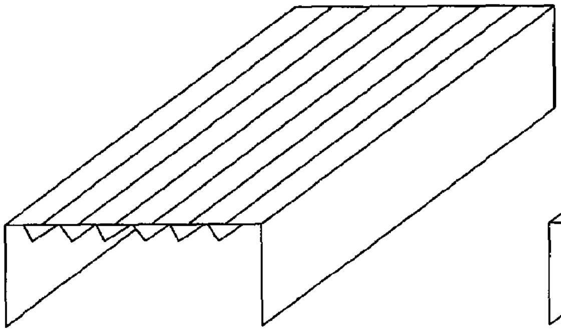
FIGS. 8(*a*) through (*c*) are conceptual perspective views of the light trap.
Figure 8:
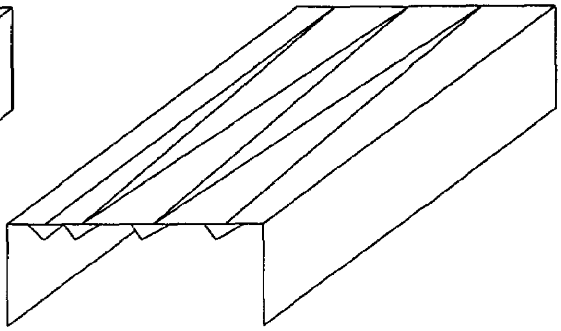
Figure 8:
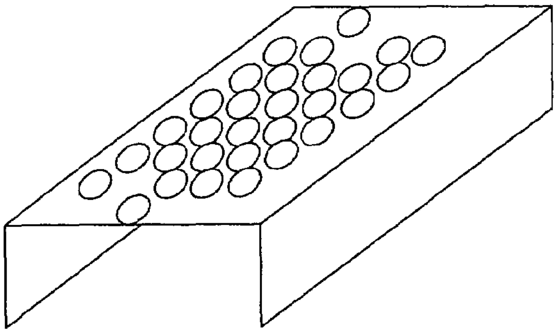
Figure 9:
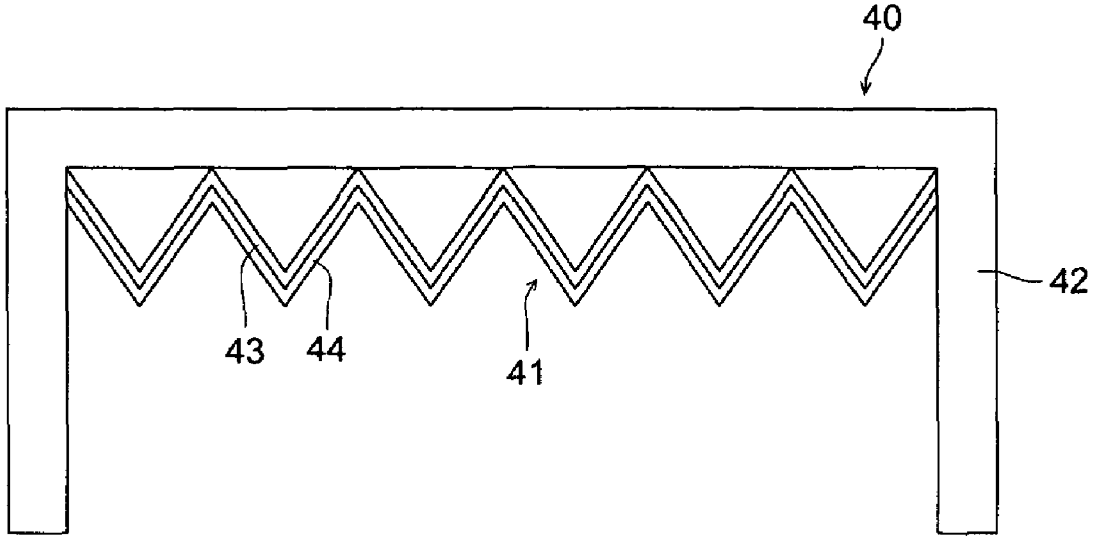
FIG. 9 is a drawing schematically representing the light trap arranged on the coated layer.

When these projections and depressions are provided along the length of the light trap, projections and depressions can be arranged in parallel along the length, as shown in FIG. 8(*a*), or can be located in a non-parallel arrangement, as shown in FIG. 8(*b*).

Further, the projections and depressions can also be provided in an island structure, as shown in FIG. 8(*c*).

FIGS. 8(*a*) through (*c*) show the case where the projections and depressions are provided on the upper surface of the light trap. They are also being arranged on the side surface where ultraviolet rays enter.

FIG. 4 shows the case where the surface of the light trap, having projections and depressions and exposed to the ultraviolet rays, is provided with the black-color processed layer 43 and inorganic ultraviolet ray absorbent coated layer 44. If the light trap of this configuration is used, the regular reflection component of the incoming ultraviolet rays can be minimized and the dispersed ultraviolet rays are absorbed by the inorganic ultraviolet ray absorbent coated layer and black-color processed layer. This arrangement improves the effect of the light trap, and provides effective prevention of curing of ink on the nozzle surface of the recording sheet.

In the present embodiment, any one of the low pressure mercury lamp, high pressure mercury lamp, metal halide lamp, hot-cathode tube, cold-cathode tube and LED can be used as the ultraviolet ray source of the ultraviolet irradiation apparatus. This configuration provides the aforementioned effect in a concrete manner.

Further, the inorganic ultraviolet ray absorbent coated layer and black-color processed layer are formed in one layer. This arrangement provides the aforementioned effects through a simple and efficient configuration.

The present invention is not restricted to the aforementioned embodiments; the design can be improved and modified as deemed appropriate, without departing from the spirit of the prevent invention.

For example, a serial type printer is used in the present embodiment, but a line printer can be used as an inkjet printer, without the prevent invention being restricted thereto.

Embodiment 2

Figure 10:
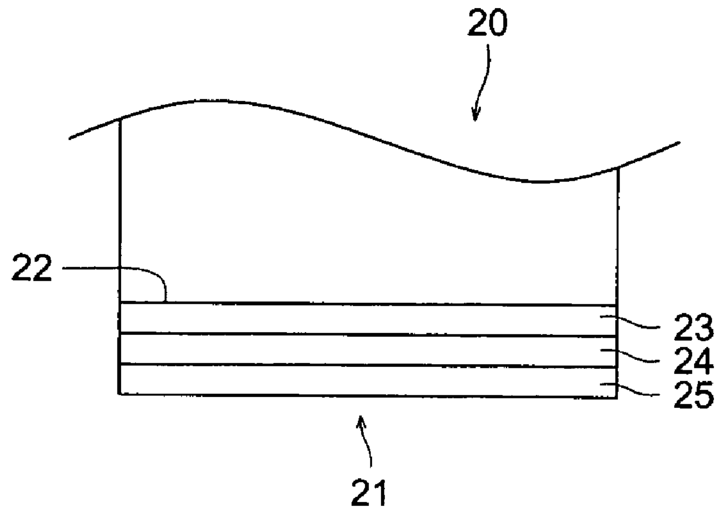
FIG. 10 is a drawing schematically representing the recording head close to the nozzle surface.
Figure 11:
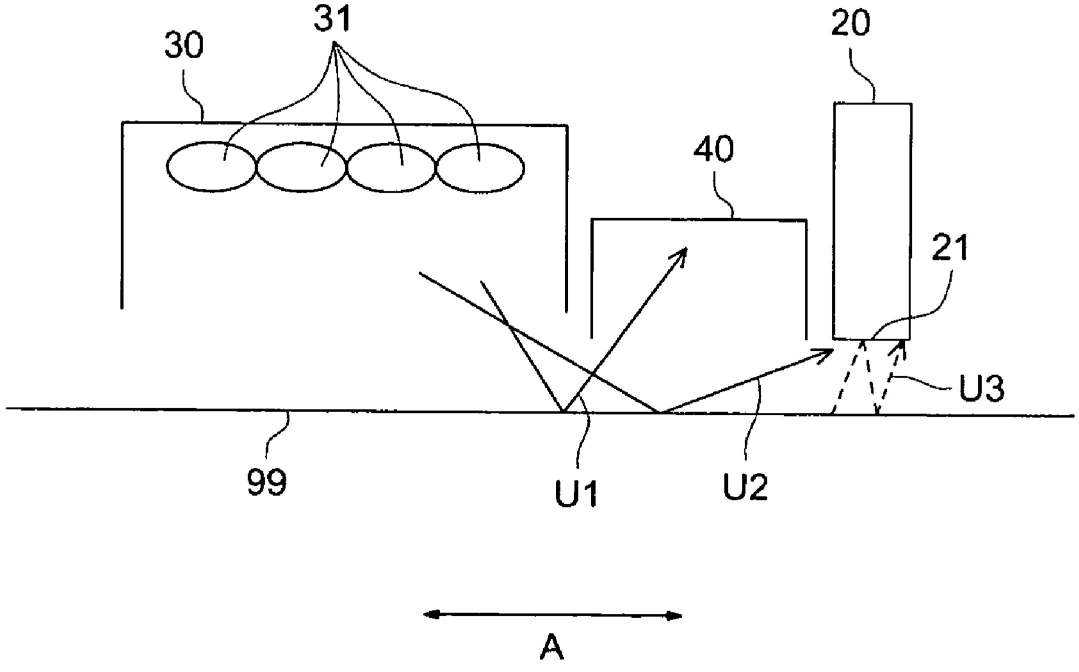
FIG. 11 is a drawing representing a recording head exposed to the ultraviolet rays from the ultraviolet irradiation apparatus.

As shown in FIG. 10, in the present embodiment, the nozzle surface 21 of the recording heads 20 is provided with black-color processing layer 23 and inorganic ultraviolet ray absorbent coated layer 24 arranged on a nozzle upper plate 22 in that order as counted from the lower layer. A water-shedding process layer 25 is provided on the topmost layer as the surface layer of the nozzle surface 21.

The nozzle upper plate 22 is formed so as to surround the aforementioned nozzle train 26. In the present embodiment, it is made of an aluminum plate or an aluminum diecast plate.

The aforementioned black-color processed layer 23 is a layer of black color for minimizing reflection of the ultraviolet rays, provided on the nozzle surface 21. In the present embodiment, it is a ceramic layer using a black-colored hard-alumite processing solution. It should be understood that the black-color processed layer 23 is not restricted thereto. For example, it is possible to use a ceramic layer using the black-colored alumite processing solution.

The inorganic ultraviolet ray absorbent coated layer 24 is a layer coated with an inorganic ultraviolet ray absorbent. The inorganic ultraviolet ray absorbent to be used is preferred to be the one that absorbs the ultraviolet rays having wavelengths of about 250 nm, 359 nm and 450 nm. To put it more specifically, the preferred layer includes the one coated with cerium oxide based inorganic ultraviolet ray absorbent such as Niedral (trade name; made by TAKI KAGAKU Co., Ltd.).

The water-shedding process layer 25 is a layer coated with a water-shedding processing solution. For example, such fluorine based water-shedding processing solution as Saitop CTX-8055 (trade mane; made by ASAHI GLASS Co., Ltd.) and FEP (perfluoroethylene-propene copolymer) can be used.

It is also possible to make such arrangements that the inorganic ultraviolet ray absorbent coated layer 24 and water-shedding process layer 25 are formed in one layer, by applying the coating agent prepared by mixing the water-shedding processing solution forming the water-shedding process layer 25, with the inorganic ultraviolet ray absorbent forming the inorganic ultraviolet ray absorbent coated layer 24.

Means may also be provided to ensure that the black-color processed layer 23, inorganic ultraviolet ray absorbent coated layer 24 and water-shedding process layer 25 are formed in one layer, by applying the coating agent preparing by mixing:

the water-shedding processing solution forming the water-shedding process layer 25;

the inorganic ultraviolet ray absorbent forming the inorganic ultraviolet ray absorbent coated layer 24; and such a processing solution as the hard-alumite processing solution or alumite processing solution forming the black-color processed layer 23.

By operating the inkjet printer arranged in the same configuration as that in the Embodiment 1, in the similar manner:

While a plurality of ultraviolet ray sources are emitting light, the transport mechanism feeds the recording medium 99 intermittently and the reciprocal movement of the carriage is repeated. During the movement of the carriage 5, the recording heads 20 ejection ink as appropriate, whereby an image is formed on the recording medium 99.

In this case, the ultraviolet rays emitted from the ultraviolet ray source 31 of the ultraviolet irradiation apparatus 30 may hit the recording medium 99 and may be reflected, as shown by the arrow marks U1, U2 and U3.

Of these reflected ultraviolet rays, the ones emitted at an angle shown by the arrow mark U1 are absorbed by the light trap 40. The ultraviolet rays emitted at an angle shown by the arrow mark U2 are absorbed by the inorganic ultraviolet ray absorbent coated layer 24 of the nozzle surfaces 21 of the recording heads 20. It should be noted that, in the present invention, ultraviolet rays are absorbed by the inorganic ultraviolet ray absorbent coated layer 24 and black-color processed layer 23. This arrangement eliminates the ultraviolet rays that exhibits irregular reflection between the nozzle surface 21 and recording medium 99, with the result that the mount of ultraviolet rays hitting the nozzle surface 21 can be reduced.

Referring to the Table of FIG. 6, the following describes the test conducted to measure the light reflection factor when the nozzle surface 21 is provided with various coated layers:

In this test, the reflection factor was measured when ultraviolet rays having wavelengths of 350 through 360 were applied to:

an aluminum diecast plate as a nozzle upper plate 22 provided with black-color alumite processing as a black-color processed layer 23 (described as "alumite (black)");

an aluminum diecast plate as a nozzle upper plate 22 provided with black-color processing as black-color processed layer 23, which is further coated with inorganic ultraviolet ray absorbent as inorganic ultraviolet ray absorbent coated layer 24 (described as "alumite (black)+UV");

an aluminum diecast plate as a nozzle upper plate 22 provided with black-color hard-alumite processing as black-color processed layer 23 (described as "hard alumite (black) ");

an aluminum diecast plate as a nozzle upper plate 22 provided with hard-alumite processing as black-color processed layer 23, which is coated with inorganic ultraviolet ray absorbent as inorganic ultraviolet ray absorbent coated layer 24 (described as "hard alumite (black)+UV"); and an aluminum diecast plate as a nozzle upper plate 22 alone (described as "diecast") Reflection factor was measured by two methods; total reflection measurement method and measurement method with regular reflection cut off. The measuring instrument used in this test was a U-3300 Spectrophotometer (150-mm diameter integrating sphere photometer) by Hitachi Limited.

As a result, as shown in the Table of FIG. 6, in the total reflection measurement method, there was almost no difference except in the case of the aluminum diecast plate alone. However, in the measurement with regular reflection cut off, the reflection factor was close to zero when the inorganic ultraviolet ray absorbent coated layer was applied. A big difference was observed as compared to the one without the inorganic ultraviolet ray absorbent coated thereon. In the present invention, it has become apparent from the above that ultraviolet rays are absorbed and irregular reflection of ultraviolet rays can be prevented by providing the nozzle surface with the inorganic ultraviolet ray absorbent coated layer.

As described above, in the inkjet printer of the present embodiment, the nozzle surface of the recording head has the inorganic ultraviolet ray absorbent coated layer and water-shedding process layer arranged on the nozzle upper plate. This arrangement minimizes the ink being deposited on the nozzle surface, by means of the water-shedding process layer. At the same time, when the nozzle surface is exposed to the ultraviolet rays, ultraviolet rays are absorbed by the inorganic ultraviolet ray absorbent coated layer, thereby preventing irregular reflection of ultraviolet rays from occurring between the recording head and recording medium. This arrangement reduces the amount of ultraviolet rays applied to the nozzle surface of the recording head, with the result that ink cannot easily be cured on the nozzle surface. Thus, this arrangement avoids ink ejection failure resulting from deposition of ink on the nozzle upper plate surface.

Especially, the present invention is provide with the coated layer using the inorganic ultraviolet ray absorbent in order to absorb ultraviolet rays, and therefore this invention is characterized by less volatilization or deterioration due to heat than a product using an organic ultraviolet ray absorbent, thereby ensuring a long-term stabilized effect.

Moreover, when ink is ultraviolet cure ink based on cation polymer including a cation polymerized compound, cation polymerized ink is highly sensitive, and therefore is cured when exposed to a low level of ultraviolet rays. However, the present invention cuts down the amount of ultraviolet rays applied to the nozzle surface, and ensures effective prevention of cation polymerized ink from being deposited on the nozzle surface.

In the present embodiment, the nozzle surface of the recording head is provided with a black-color processed layer on the nozzle upper plate, and the inorganic ultraviolet ray absorbent coated layer and water-shedding process layer are further provided thereon; therefore, ultraviolet ray absorbing effect is further enhanced by the black-color processed layer.

Further, if the inorganic ultraviolet ray absorbent coated layer and water-shedding process layer are formed in one layer; hence, the aforementioned effects can be by a simple and efficient arrangement.

In the present embodiment, the nozzle upper plate is made up of aluminum plate or aluminum diecast plate. This arrangement permits easy processing and reduction in product weight at the time of manufacturing. It also ensures uniform film thickness and uniform black coloring when providing black alumite treatment and black hard-alumite treatment suitable for a black-colored layer, and facilitates the formation and management of the black-colored layer.

Further, in the present embodiment, the ultraviolet ray source of the ultraviolet irradiation apparatus can be any one of the low pressure mercury lamp, high pressure mercury lamp, hot-cathode tube, cold-cathode tube and LED. This configuration provides the aforementioned effect in a concrete manner.

The present invention is not restricted to the aforementioned embodiment; the design can be improved and modified as deemed appropriate, without departing from the spirit of the prevent invention.

For example, a serial type printer is used in the present embodiment, but a line printer can be used as an inkjet printer, without the prevent invention being restricted thereto.

Embodiment 3

The second embodiment has been described with reference to the surface of the nozzle upper plate 22 (nozzle surface 21) constructed in such a manner that the black-color processed layer 23 is provided on the substrate of the nozzle upper plate 22 consisting of the aluminum plate or aluminum diecast plate, and the inorganic ultraviolet ray absorbent coated layer 24 and water-shedding process layer 25 are provided thereon.

The third embodiment will be described with reference to the nozzle surface constructed in such a manner that the water-shedding process layer is laid on the nozzle upper plate.

In the following description, the same portions as the aforementioned embodiment 2 will be assigned with the same numerals of reference, and will not be described to avoid duplication.

Figure 12:
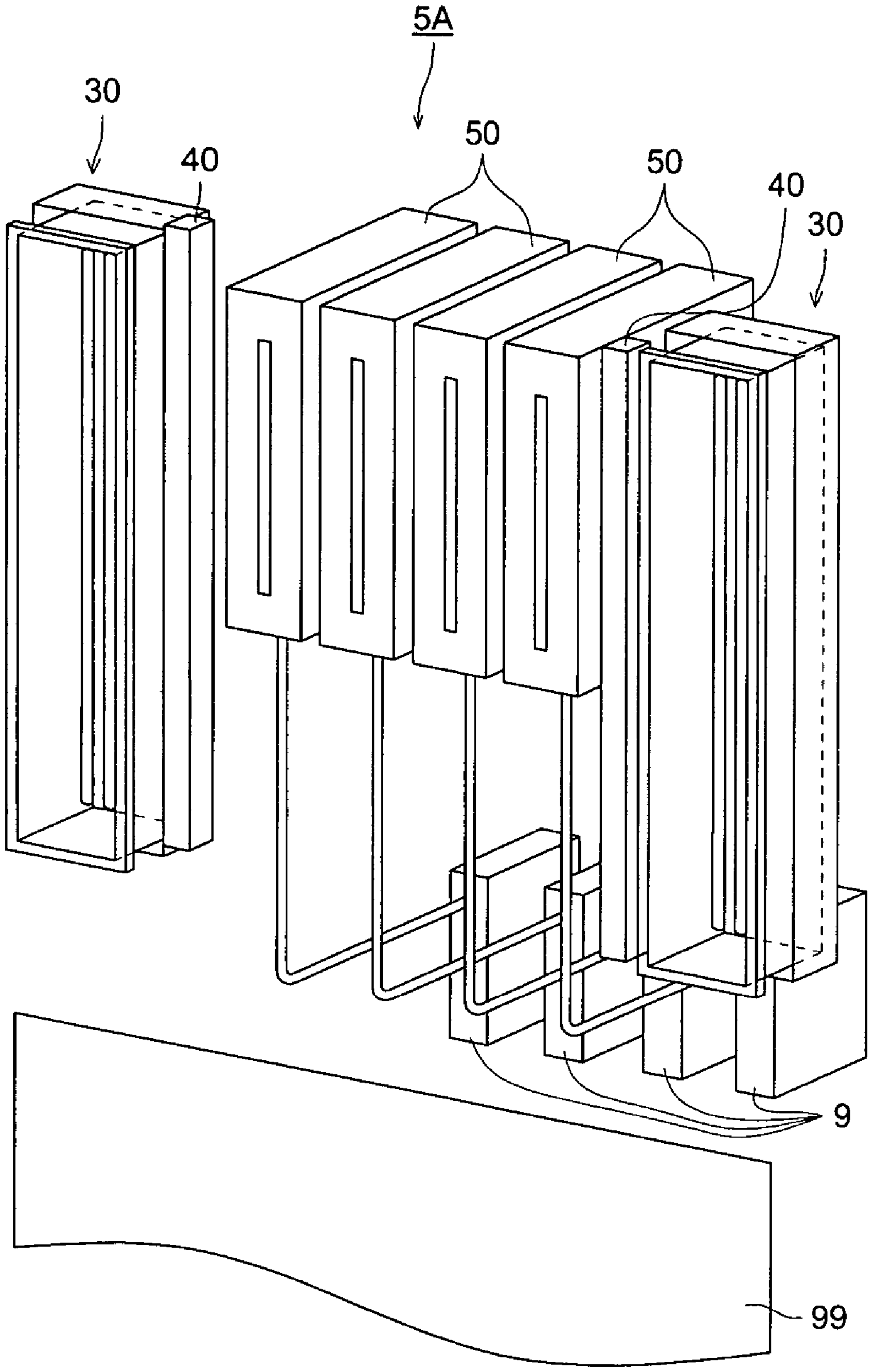
FIG. 12 is a perspective view representing the carriage 5A of an inkjet printer as a second embodiment of the present invention.

Referring to the FIGS. 12 and 22, the following describes the carriage 5A mounted on the inkjet printer in the third embodiment. FIG. 12 is a perspective view representing the carriage 5A.

As shown in FIG. 7, the carriage 5A is provided with:

a pair of ultraviolet irradiation apparatuses 30 are mounted on both ends thereof, a pair of light traps 40 arranged inside the pair of ultraviolet irradiation apparatuses 30;

four recording heads 50 located between the pair of light traps 40; an four sub-tanks 9 corresponding to recording heads 50.

Figure 13:
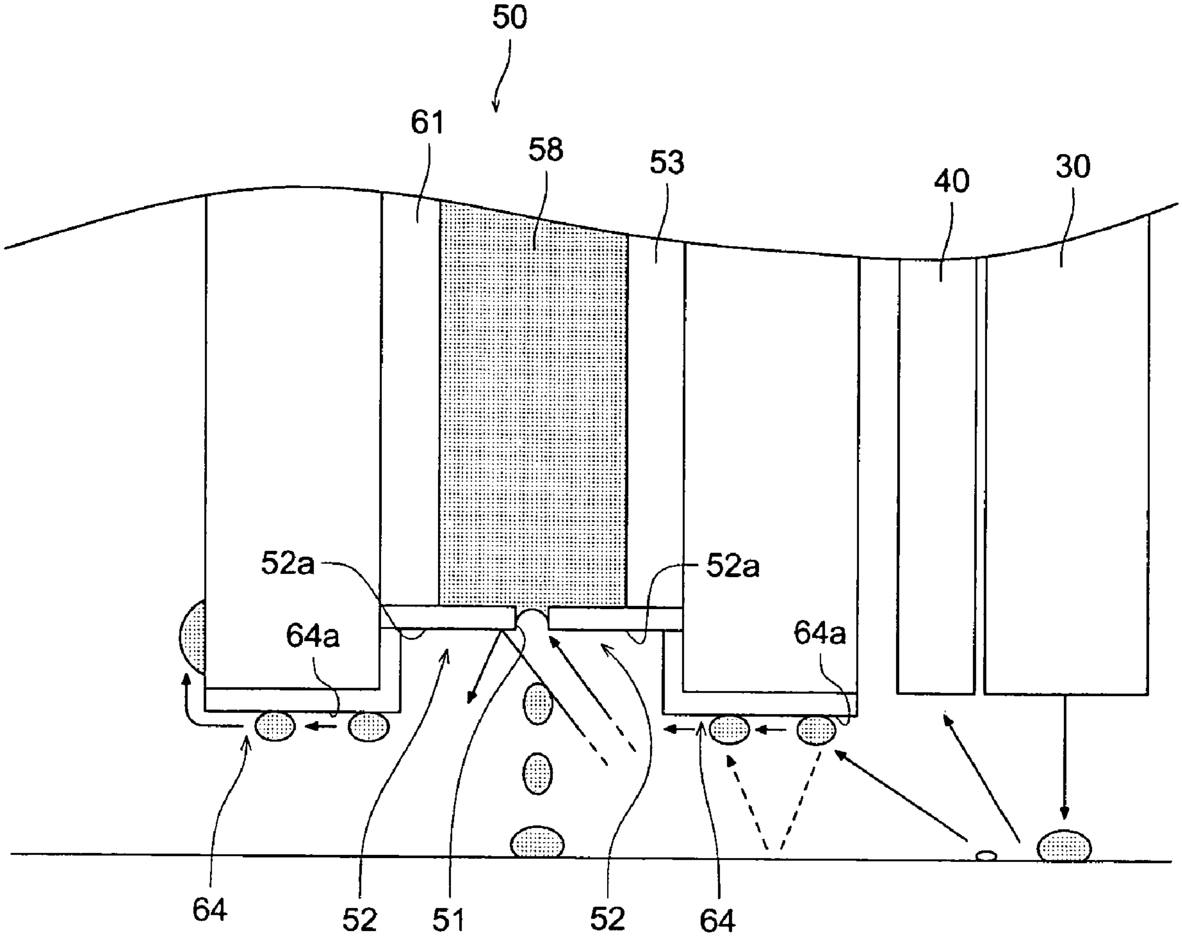
FIG. 13 is a cross sectional view representing the schematic configuration of the recording head of an ink-jet printer of FIG. 12.
Figure 14:
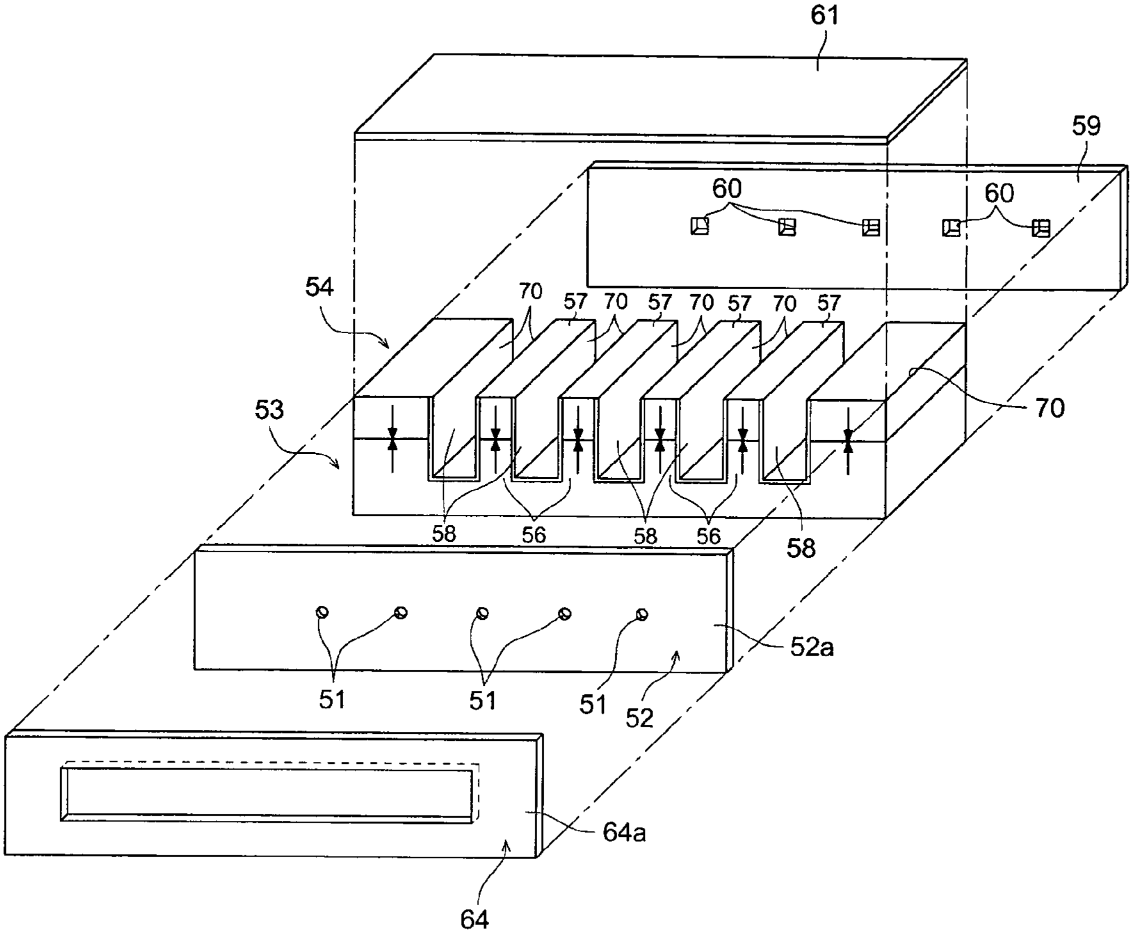
FIG. 14 is a perspective exploded view showing the internal configuration of the recording head of FIG. 13.

FIG. 13 is a cross sectional view representing the schematic configuration of the recording head 50. FIG. 14 is a perspective exploded view showing the internal configuration of the recording head 50. As shown in FIGS. 13 and 14, the recording head 50 is equipped with the nozzle upper plate 52 having a plurality of ink outlets 51, and a pair of piezoelectric devices 53 and 54, arranged one on top of the other, for ejecting ink from each ink outlet 51. The piezoelectric device 53 as one of the pair of piezoelectric devices 53 and 54 is equipped with a plurality of walls 56 standing upright. The other piezoelectric device 54 is provided with a wall 57 to be built with each wall 56 of the piezoelectric device 53. The arrow mark in the drawing indicates the direction in which the piezoelectric devices 53 and 54 are polarized. Each of the walls 56 and 57 forms a plurality of pressure chamber 58 by placing the pair of piezoelectric devices 53 and 54 one on top of the other. Further, the bottom surfaces of the piezoelectric devices 53 and 54 placed one on top of the other are fixed with the nozzle upper plate 52 in such a manner that each ink outlet 51 corresponds to each pressure chamber 58. This arrangement allows the plurality of pressure chamber 58 to form an ink flow path that guides the ink to each of ink outlets 51.

A supply plate 59 for supplying the ink from the sub-tanks 9 to each of the pressure chambers 58 is secured on the side opposite to the nozzle upper plate 52 in the piezoelectric devices 53 and 54. An inlet 60 for feeding ink into each of the pressure chambers 58 is formed on this supply plate 59. On the top surface of the other piezoelectric device 54, a cover plate 61 for blocking each of the pressure chambers 58 is secured to the wall 57.

Figure 15:
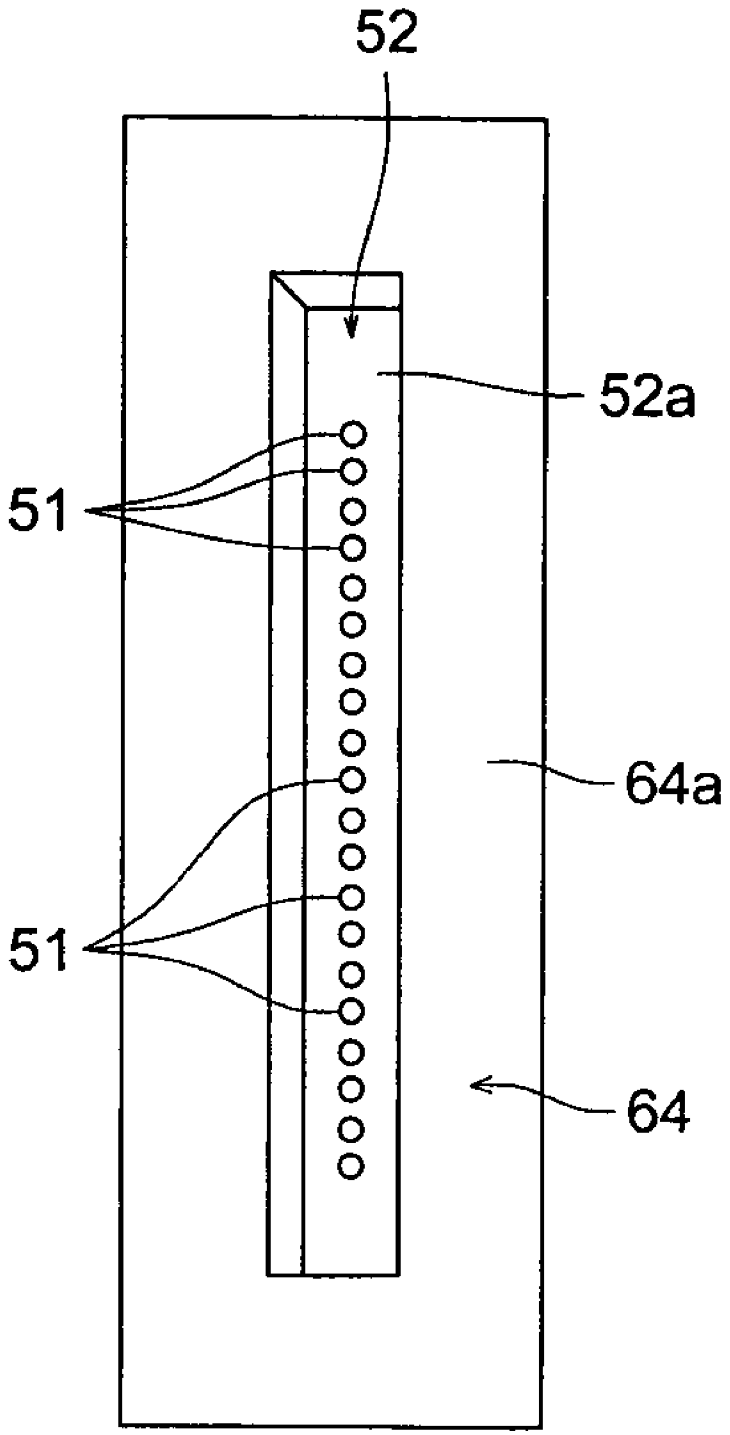
FIG. 15 is a perspective view representing the nozzle upper plate of the recording head of FIG. 13.

FIG. 15 is a perspective view representing the nozzle upper plate 52 and its surrounding area. As shown in FIGS. 13 and 15, the nozzle upper plate 52 with a plurality of ink outlets 51 formed thereon is provided with a protection upper plate 64 that surrounds and protects the nozzle upper plate 52.

The substrates of this nozzle upper plate 52 and protection upper plate 64 is formed of the material that absorbs 80% or more of ultraviolet rays having a wavelength of 220 nm or more without exceeding 400 nm. The material having an ultraviolet ray absorbency index of 80% or more includes such inorganic substances as aluminum, carbon black, ultrafine particle titanium oxide, ultrafine particle zinc oxide and iron oxide ($\alpha$-$Fe_2O_3$, $Fe_3O_4$) cerium oxide; and such organic substances as benzotriazole based compound, aromatic compound and polyimide resin. A water-shedding process layer is laid on the substrates of the nozzle upper plate 52 and protection upper plate 64.

The water-shedding process layer must be formed in such a manner that the critical surface tension on the surface thereof is lower than the surface tension of the ultraviolet cure ink, in order to improve the water-shedding performances with respect to ultraviolet cure ink. If the critical surface tension on the surface 52*a* of the nozzle upper plate 52 and the surface 64*a* of the protection upper plate 64 is equal to or greater than the surface tension of the ultraviolet cure ink, the ink spreads in such a way as to cover the surface 52*a* of the nozzle upper plate 52 and the surface 64*a* of the protection upper plate 64 when the ultraviolet cure ink has come in contact with the surface 52*a* of the nozzle upper plate 52 and the surface 64*a* of the protection upper plate 64; then the ink is cured and deposited when exposed to ultraviolet rays.

Figure 16:
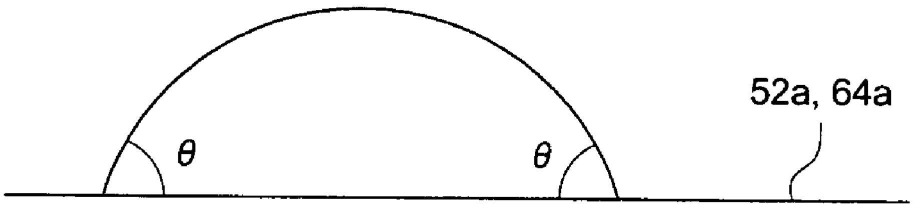
FIG. 16 is an explanatory diagram showing the contact angle θf ink particles.

Since the surface tension o the solid surface cannot be measured directly. As shown in FIG. 16, various liquids whose surface tension is known are placed on the surface 52*a* of the nozzle upper plate 52 and the surface 64*a* of the protection upper plate 64, and contact angle $\theta$ is measured. The contact angle $\theta$ is plotted against surface tension and extrapolation method is to get the surface tension where the contact angle $\theta$ is zero. This is assumed as surface tension (critical surface tension $\gamma c$) of the solid surface. To put it another way, to repel ultraviolet cure ink, the water-shedding process layer requires use of a material having a critical surface tension lower than the surface tension of the ultraviolet cure ink. Since the general ultraviolet cure ink has a surface tension of about 25 through 35 mN/m, it is preferred that the critical surface tension $\gamma c$ on the surface 52*a* of the nozzle upper plate 52 and the surface 64*a* of the protection upper plate 64 be 25 mN/m or less. The material having a critical surface tension of 25 mN/m or less includes FEP, Saitop, Teflon (polytetrafluoroethylene; registered trademark), AF, PTFE microscopic particulates, nickel eutectogenic plating and perfluoroalkyl silane.

To get quick and reliable water-shedding property, it is more preferred that the critical surface tension $\gamma c$ on the surface 52*a* of the nozzle upper plate 52 and the surface 64*a* of the protection upper plate 64 be 15 mN/m or less. The material having a critical surface tension $\gamma c$ of 15 mN/m or less includes perfluoroalkyl silane.

Figure 17:
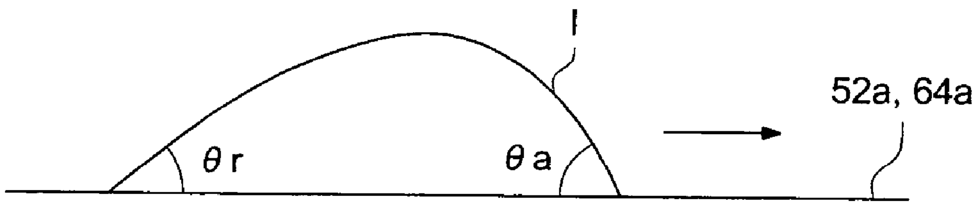
FIG. 17 is an explanatory diagram showing the forward contact angle and backward contact angle θf ink particles.

To remove the ultraviolet cure ink deposited on the surface 52*a* of the nozzle upper plate 52 and the surface 64*a* of the protection upper plate 64, these surfaces are cleaned repeatedly by a wiper member (not illustrated). Since wiping involves the mobility of the ink particles on the surfaces 52*a* and 64*a*, the following describes the mobility of ink particles on the surfaces 52*a* and 64*a*. For example, when the ink particle 1 starts movement due to wiping operation as shown in FIG. 17, the balanced contact angle θ of the ink particle 1 disappears, and forward contact angle θa and backward contact angle θr appear, instead. The difference between forward contact angle θa and backward contact angle θr is called the contact angle hysteresis. The forward contact angle θa is the contact angle with respect to the surface not yet wetted by ink, while the backward contact angle θr refers to the contact angle with respect to the surface already wetted by ink. Since the quantity of the ink particle 1 is very small, the gravity can be ignored. The force acting on this surface tension of ink works in the direction of moving the ink particle 1 and in the direction where the movement of ink 1 is prevented. Even if the forward contact angle θa is high, the contact angle hysteresis is reduced if the backward contact angle θr is low. This makes it difficult for ink particle 1 to move. The balanced contact angle commonly measured is close to the forward contact angle θa. Even if the forward contact angle θa is high, ink contamination cannot be removed easily by wiping, if the backward contact angle θr is low. Accordingly, in a system where both forward contact angle θa and backward contact angle θr are high, the contact angle hysteresis can be reduced, and the mobility of ink particles and wiping properties can be improved.

Figure 18:
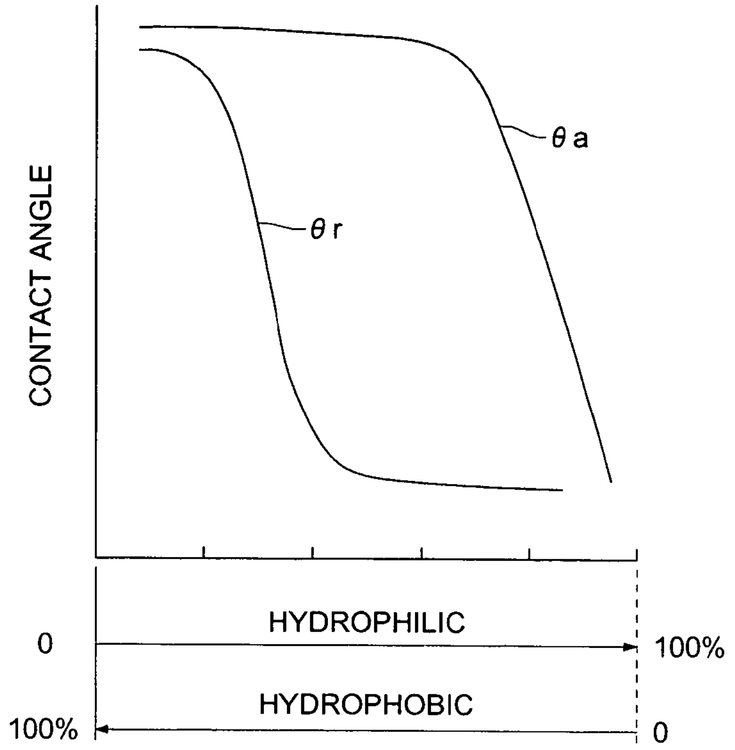
FIG. 18 is a drawing showing the relationship between the forward contact angle and backward contact angle with respect to hydrophilicity and hydrophobicity.

FIG. 18 is a drawing showing the relationship between the forward contact angle θa and backward contact angle θr with respect to hydrophilicity and hydrophobicity. As shown in FIG. 18, it will be readily understood that the forward contact angle θa is not sensitive to the presence of hydrophilic area on the surfaces 52*a* and 64*a*, whereas the backward contact angle θr is sensitive to the presence of hydrophilic area on the surfaces 52*a* and 64*a*. In other words, the forward contact angle θa exhibits a high contact angle even if the hydrophilic surface contains a large hydrophilic area. In the meantime, the backward contact angle θr shows a quick reduction even if the hydrophobic surface contains a small hydrophilic area. This shows that, if a water-shedding process layer is selected merely for a high contact angle, ink may not be removed by wiping even if ink can be repelled effectively.

Figure 19:
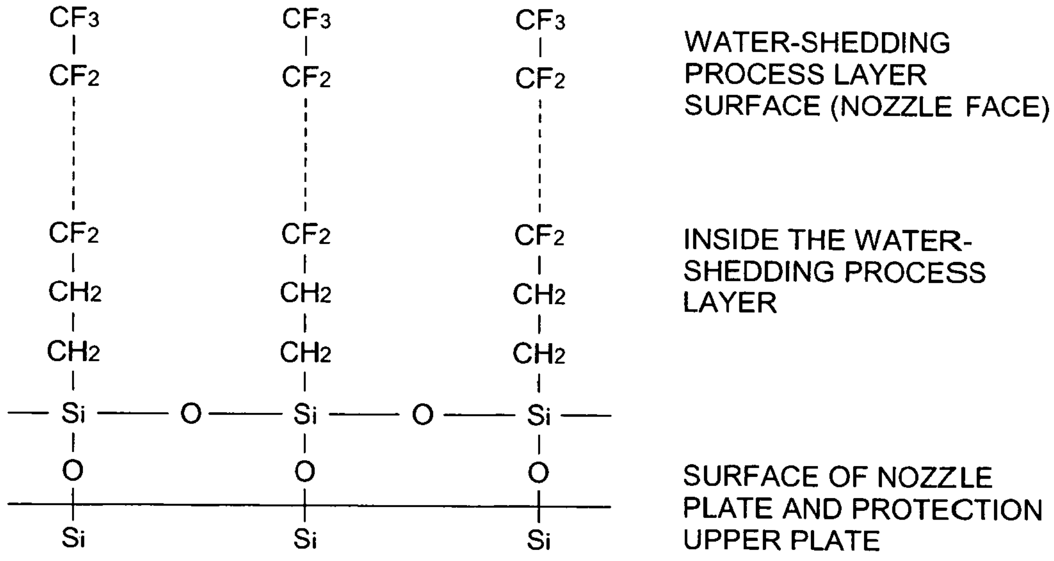
FIG. 19 is an explanatory drawing representing an example of water-shedding process layer arranged on the nozzle upper plate of FIG. 10.

Since the water-shedding process layer is wiped repeatedly, means must be taken to ensure that the water-shedding process layer is not separated by wiping. This requires the water-shedding process layer to be bonded securely to the nozzle upper plate 52 and protection upper plate 64. For example, In the case of the $CF_3(CF_3)_7CH_2CH_2Si(OCH_3)_3$ as one type of perfluoroalkyl silane, one of three methoxy groups is bonded with the hydroxyl group on the surface of the nozzle upper plate 52, as shown in FIG. 19, and the remaining two are bonded with moisture content in air to be converted into hydroxyl group. They are condensed by heat treatment to form a closely packed siloxane network. This arrangement allows the $CF_3$ group to be oriented on the surface, so that the critical surface tension of the surfaces 52*a* and 64*a* becomes 6 mN/m. As described above, if the hydrophilic component does not appear on the surfaces 52*a* and 64*a*, the backward contact angle θr is high, and wiping performances can be enhanced. In practice, an oxygen atom and carbon atom, in addition to CF3 group, appears on the surface, with the result that the critical surface tension is 10 through 15 mN/m. A high degree of durability is ensured since this water-shedding process layer is in the state of covalent bondage with the nozzle upper plate 52 and protection upper plate 64 through the oxygen atom, and is subjected to three-dimensional cross-linkage through the oxygen atom.

The following describes the operation of the recording head 50 when ink is ejected and not ejected:

The piezoelectric devices 53 and 54 of the recording head 50 expands or contracts when voltage is applied. If the piezoelectric devices 53 and 54 are deformed and the pressure chambers 58 expands, then ink in the nozzle is pulled into the pressure chamber. If it contracts, ink in the nozzle is pushed out.

Figure 20:
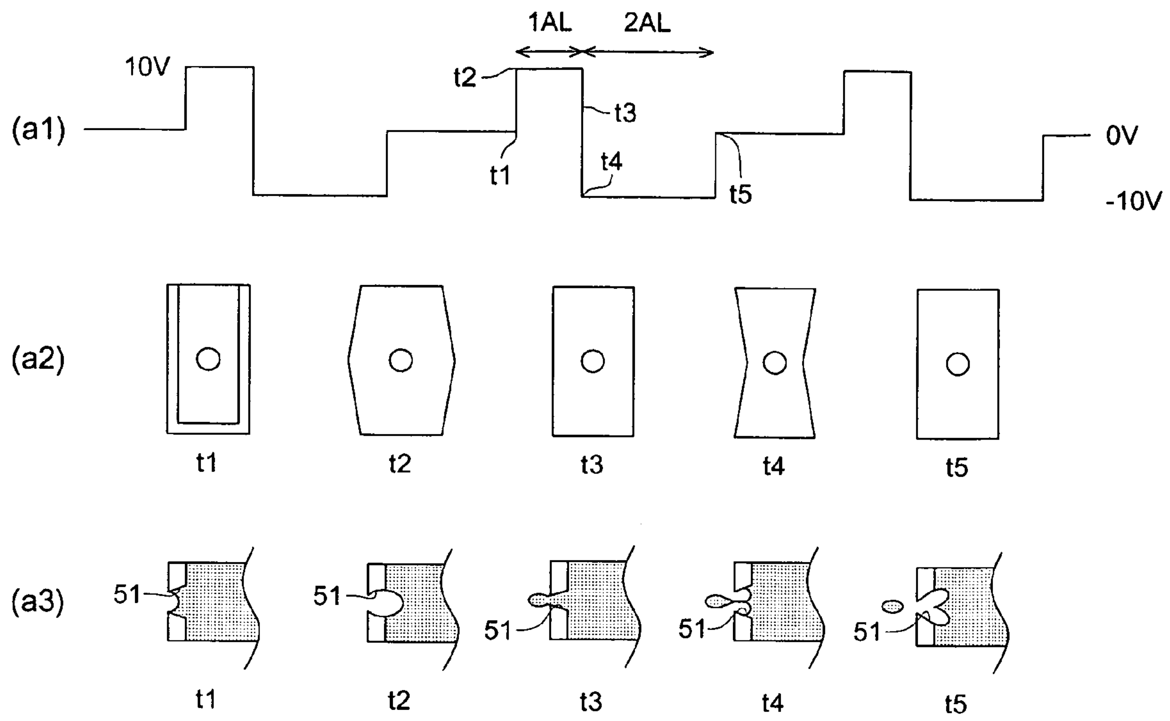
FIGS. 20(*a*) and (*b*) are drawings showing the voltage waveform applied to a piezoelectric device, a vertical section of an pressure chamber and a transverse cross section of the pressure chamber.
Figure 20:
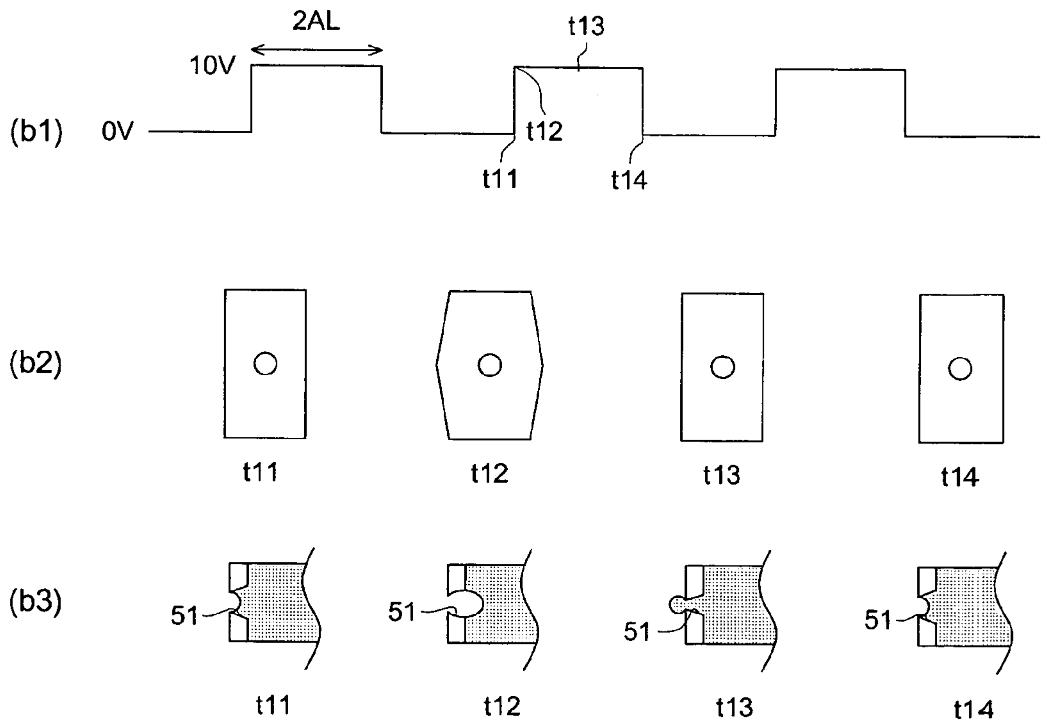

FIGS. 20(*a*) and (*b*) show the waveform of the voltage applied to the piezoelectric devices 53 and 54, a cross section of the pressure chambers 58 and a cross section of the pressure chamber. FIG. 20(*a*) shows the case when ink is ejected, while FIG. 20(*b*) represents the case when ink is not ejected. In FIGS. 15(*a*) and (*b*), the (a1) and (b1) show the waveform of voltage, (a2) and (b2) the vertical section of the pressure chamber, and (a3) and (b3) the transverse section of the pressure chamber.

When ink is ejected as shown in FIG. 15(*a*) and voltage is not applied, the cross section of the pressure chamber is not deformed in (t1) since piezoelectric devices 53 and 54 are not deformed. Ink in the ink outlets 51 remains in the state where the meniscus is maintained.

After that, when a voltage of +10V is applied (t2), the piezoelectric devices 53 and 54 are deformed so that the cross section of the pressure chamber is expanded. Ink pressure is turned negative and ink in the ink outlet 51 is pulled into the pressure chambers 58. In this case, the time of applying the +10-volt voltage is set to the time when voltage wave is propagated from end to end of the nozzle (acoustic length AL).

With the lapse of time AL, a voltage of −10V is applied to the piezoelectric devices 53 and 54, and the piezoelectric devices 53 and 54 are deformed, and pressure inside the pressure chambers 58 is changed from negative to positive pressure. Synchronously with it, voltage applied to the piezoelectric devices 53 and 54 is removed, and then the cross section of the pressure chamber is reduced. When the cross section of the pressure chamber has been reduced to the original level (t3), ink is pushed out of the ink outlets 51. When the cross section of the pressure chamber has been reduced completely (t4), ink particles are formed. In this case, since the time of applying a voltage of −10V offsets the residual pressure when a voltage of +10V is applied, it is set to double the time AZL.

With the lapse of time 2AL, voltage is not applied to the piezoelectric devices 53 and 54, and the cross sections of the piezoelectric devices 53 and 54 as well as nozzles are reduced to the original level (t5). This arrangement allows ink particles to be separated from ink outlets 51 and to be ejected. Then these operations are repeated.

In the meantime, when ink is not ejected, as shown in FIG. 20, the piezoelectric devices 53 and 54 are not deformed, so the cross section of the pressure chamber is not deformed. Ink in the ink outlets 51 remains in the state where the meniscus is maintained.

After that, when a voltage of +10V is applied (t2), the piezoelectric devices 53 and 54 are deformed so that the cross section of the pressure chamber is expanded. Ink in the ink outlet 51 is pulled into the pressure chambers 58. In this case, the time of applying the +10-volt voltage is set to 2AL.

With the lapse of time 2AL (t13), ink pressure is reversed into positive pressure and the meniscus is pulled out of the nozzle. With the lapse of another time 1AL (t14), the meniscus is pulled inside. If the deformation of the pressure chambers 58 is removed synchronously with it, the meniscus returns to the normal position. Until a voltage of +10V is applied again, the ink pushed inside returns to the ink outlets 51 to maintain the meniscus. After that, this procedure is repeated.

As described above, the piezoelectric devices 53 and 54 for ejecting ink causes micro-vibration of the ink meniscus at the voltage waveform that does not allow ink to be ejected in the ink ejection suspension mode. This procedure allows the ink in the nozzle to be agitated because ink repeats the cycle of being pushed out of the ink outlets 51 and pushed out of it. This arrangement prevents ink in the nozzle from being cured, despite ultraviolet rays entering the nozzle in the ejection suspension mode.

The present invention is not restricted to the aforementioned embodiment; the design can be improved and modified as deemed appropriate, without departing from the spirit of the prevent invention.

For example, a serial type printer is used in the present embodiment, but a line printer can be used as an inkjet printer, without the prevent invention being restricted thereto.

Further, the aforementioned embodiment has been described with reference to:

the nozzle surface 21 constructed in such a manner that the black-color processed layer 23 is provided on the nozzle upper plate 22 as a nozzle upper plate consisting of the aluminum plate or aluminum diecast plate, and the inorganic ultraviolet ray absorbent coated layer 24 and water-shedding process layer 25 are provided thereon; and the surfaces 52*a* and 64*a* formed by the water-shedding process layer provided on the nozzle upper plate 52 and protection upper plate 64 made of the material having an ultraviolet ray absorbency index of 80% or more. If the ultraviolet ray absorbency index on the surface is 80% or more and the critical surface tension is lower than the surface tension of ink, the nozzle upper plate and protection upper plate may be formed in any configuration. For example, in addition to the aforementioned configuration, the nozzle upper plate and protection upper plate, made of a water-shedding material, having an ultraviolet ray absorbency index of 80% or more can be given as an example.

In the aforementioned embodiment, no reference is made to the interval between the surfaces of the nozzle upper plate and protection upper plate, and the recording medium 99. The preferred interval is 1 mm or more without exceeding 4 mm. The smaller the interval between the nozzle upper plate surface and recording medium 99, the shorter will be the flying distance of the ink particles ejected from the recording heads 20 and 50. This avoids curved flying of ink and provides a sharper image. However, if this interval is less than 1 mm and foreign substances are deposited on the surfaces of the heads 20 and 50, jamming of the recording medium 99 and damages of the nozzle upper plate and protection upper plate surfaces will be caused by the foreign substances. Thus, if the interval between the nozzle upper plate protection upper plate, and the recording medium 99 is not less than 1 mm, a trouble due to foreign substances can be avoided.

In the meantime, if the interval between the nozzle upper plate surface and the recording medium 99 is longer than 4 mm, the aforementioned image sharpness will be reduced. Not only that, the ultraviolet rays reflected by the surface of the recording medium 99 easily enters the ink outlets 51. If the interval between the nozzle upper plate and protection upper plate surfaces, and the recording medium 99 does not exceed 4 mm, it is possible to increase the number of reflections of ultraviolet rays between the recording medium 99, and the nozzle upper plate and protection upper plate surfaces. Ultraviolet rays will be absorbed many times by the nozzle upper plate and protection upper plate surfaces before they reach the ink outlets 51, with the result that the amount of ultraviolet rays reaching the ink outlets 51 can be reduced.

In the aforementioned description of the present embodiment, reference has been made to the nozzle upper plate and protection upper plate surfaces as reflecting the ultraviolet rays. There are other portions that reflect the ultraviolet rays. These portions are also preferred to have an ultraviolet ray absorbency index of at least 80%, or more preferably, at least 90%. The portions that reflect the ultraviolet rays include the direct reflecting member that directly reflects the ultraviolet rays from the ultraviolet irradiation apparatus 30 and the indirect reflecting member that again reflects the ultraviolet rays once reflected.

The direct reflecting member is a member located opposite to the ultraviolet ray source. It can be exemplified by a recording medium, platen, maintenance unit, transport mechanism, covers, casings and chassis. If the ultraviolet ray absorbency index is enhanced, the amount of the ultraviolet rays entering the ink outlet can be reduced by a synergistic effect.

The following describes the third embodiment with reference to the examples using the inkjet printer mentioned in the description of the second embodiment.

A fluorescent tube having a main peak in the wavelength of 313 nm was used as an ultraviolet ray source. For the recording medium located immediately below the ultraviolet rays, settings were determined to ensure that luminance of the ultraviolet rays having a wavelength ranging from 220 through 400 nm would be 8 $mW/cm^2$. The luminance was measured using an instrument, Model USR40 by Ushio Inc.

Cation polymerized magenta ink was used as ultraviolet cure ink. To prepare this ink, a magenta pigment dispersant was first prepared, which was composed of 15 parts of PR-184 by mass, 2 parts of dispersant by mass and 83 parts of aron oxetane OXT-221 by mass. Then this magenta pigment dispersant was mixed with 17 parts of the magenta pigment dispersant by mass, 40 parts of aron oxetane OXT-221 by mass, 30 parts of aron oxetane 221 by mass, 30 parts of Seroxide by mass and 5 parts of UV16990 (photo-oxy-generator) by mass, and was passed through a 0.8-micron membrane filter. It was heated at 50 degrees Celsius and was subjected to dehydration under reduced pressure, thereby getting magenta ink. This magenta ink had a viscosity of 32.5 mPa/s and a surface tension of 35.2 mN/m at 25 degrees Celsius.

The recording head used an inkjet head that ejected ultraviolet cure ink of liquid particle size of 7 pl at a nozzle pitch of 360 dpi by means of a piezoelectric device. This inkjet head is provided with a heater for heating the nozzle.

The nozzle upper plate in this recording head uses a polyimide plate (by UBE INDUSTRIES LTD; Yupirex) where the reflection factor is 15.4% when the regular reflecting component is included and 0.9% when not included. One side of this polyimide plate was protected by application of a resist, and the other side was coated with 11 mN/m of perfluoroalkyl silane solution (by NI Material; INT444). This perfluoroalkyl silane solution was heated at 300 degrees Celsius to form a siloxane network, thereby forming a water-shedding process layer. This water-shedding process layer had a forward contact angle θf of 82 deg., and a backward contact angle θf of 44 deg. An inlet having a diameter of 26 microns was formed on this polyimide plate, using an excimer laser.

The protection upper plate surrounding the nozzle upper plate for protection is made by black-alumite processed aluminum. Water-shedding process layer was provided on the surface, similarly to the case of the nozzle upper plate. The reflection factor of the black-alumite processed aluminum was 5% when regular reflecting component was included, and 3.1% when not included.

In this embodiment, the interval between the recording head nozzle surface and recording medium is set at 1.5 mm; the interval between the recording head nozzle surface and platen top surface at 1.7 mm; the interval between the carriage bottom surfaced and platen top surface at 1.5 mm; and the interval between the ultraviolet ray source and platen top surface at 20 mm.

Various ink ejection tests were conducted on the recording medium, using the aforementioned inkjet printer and ultraviolet cure ink. The following describes the conditions and results of ejection tests:

[Ejection Test 1]

With the interval between the recording head and recording medium kept at 1 mm, the recording medium was exposed to the ultraviolet rays from the ultraviolet irradiation apparatus, and 5 μl of ink particles were ejected from the recording head at a speed of 8 m per second at a ejection frequency of 12 kHz for 30 minutes on a continual basis.

After a lapse of 30 minutes in this test, there was no ejection failure such as ejection suspension, reduction in ink flying speed or curving of ejection direction.

Evaluation: Excellent

[Ejection test 2]

With the interval between the recording head and recording medium kept at 1 mm, the recording medium was exposed to the ultraviolet rays from the ultraviolet irradiation apparatus, and 5 μl of ink particles were ejected from the recording head at a speed of 8 m per second at a ejection frequency of 12 kHz for one minute and were suspended for one minute repeatedly (ejecting on an intermittent basis), and this operation was conducted for a total of 30 minutes. In the ink ejection suspension mode, the voltage waveform that did not allow ink to be ejected was applied to the piezoelectric devices to cause micro-vibration of ink meniscus in the ink outlet.

After a lapse of 30 minutes in this test, there was no ejection failure such as ejection suspension, reduction in ink flying speed or curving of ejection direction.

Evaluation: Excellent

[Ejection test 3]

With the interval between the recording head and recording medium kept at 1 mm, the recording medium was exposed to the ultraviolet rays from the ultraviolet irradiation apparatus, and 5 μl of ink particles were ejected from the recording head at a speed of 8 m per second at a ejection frequency of 12 kHz for one minute and were suspended for one minute repeatedly (ejecting on an intermittent basis), and this operation was conducted for a total of 30 minutes. However, micro-vibration was not given to ink meniscus in the ink outlet in the ink ejection suspension mode.

As a result, ink was normally ejected in the initial stage of ejection, but image density was gradually reduced thereafter. It can be considered that this was caused by the ink being thickened by the ultraviolet rays entering the ink outlet, and reduction in the weight of ink par articles, since micro-vibration was not given to ink in the ink ejection suspension mode.

When the recording head was moved to the maintenance unit and ink was ejected in the idle mode, the ejection failure could be remedied but this procedure required frequent suspension of ejection operations. Further, costly ink had to be wasted.

Evaluation: Medium quality

[Ejection test 4]

With the interval between the recording head and recording medium kept at 5 mm, the recording medium was exposed to the ultraviolet rays from the ultraviolet irradiation apparatus, and 5 μl of ink particles were ejected from the recording head at a speed of 8 m per second at a ejection frequency of 12 kHz for one minute and were suspended for one minute repeatedly (ejecting on an intermittent basis), and this operation was conducted for a total of 30 minutes. In the ink ejection suspension mode, the voltage waveform that did not allow ink to be ejected was applied to the piezoelectric devices to cause micro-vibration of ink meniscus in the ink outlet.

As a result, ink was normally ejected in the initial stage of ejection, but image density was gradually reduced thereafter. It can be considered that this was caused by an excessive interval between the recording head and recording medium. Thus, there was a reduction in the frequency of reflections of ultraviolet rays, and sufficient absorption of ultraviolet rays could not be achieved.

When the recording head was moved to the maintenance unit and ink was ejected in the idle mode, the ejection failure could be remedied but this procedure required frequent suspension of ejection operations.

Evaluation: Medium quality

[Ejection test 5]

With the interval between the recording head and recording medium kept at 1 mm, the recording medium was exposed to the ultraviolet rays from the ultraviolet irradiation apparatus, and 5 μl of ink particles were ejected from the recording head at a speed of 8 m per second at a ejection frequency of 12 kHz for 30 minutes on a continual basis. After a lapse of 30 minutes, ejecting was suspended for one hour. During this time, the voltage waveform that does not allow ink to be ejected was applied to the piezoelectric devices to cause micro-vibration of ink meniscus in the ink outlet. After a lapse of one hour, continuous ink ejecting was conducted under the same conditions for 30 minutes again.

As a result, there was no ejection failure such as ejection suspension, reduction in ink flying speed or curving of ejection direction. No image deterioration was observed.

Evaluation: Excellent

[Ejection test 6]

With the interval between the recording head and recording medium kept at 1 mm, the recording medium was exposed to the ultraviolet rays from the ultraviolet irradiation apparatus, and 5 pl of ink particles were ejected from the recording head at a speed of 8 m per second. at a ejection frequency of 12 kHz for 30 minutes on a continual basis. After a lapse of 30 minutes, ejecting was suspended for one hour. In this case, immediately before one hour passed, the voltage waveform, that does not allow ink to be ejected, was applied to the piezoelectric devices to cause micro-vibration of ink meniscus in the ink outlet. After that, the voltage waveform in the ink ejection mode was applied to the piezoelectric devices and ink was ejected in the idle mode. After a lapse of one hour, continuous ink ejecting was conducted under the same conditions for 30 minutes again.

As a result, there was no ejection failure such as ejection suspension, reduction in ink flying speed or curving of ejection direction. No image deterioration was observed.

Evaluation: Excellent

[Ejection test 7]

FEP was used as the water-shedding process layer for the nozzle upper plate of the recording head. With the interval between the recording head and recording medium kept at 1 mm, the recording medium was exposed to the ultraviolet rays from the ultraviolet irradiation apparatus, and 5 μl of ink particles were ejected from the recording head at a speed of 8 m per second at a ejection frequency of 12 kHz for 30 minutes on a continuous basis.

As a result, a solid substance was deposited on the nozzle surface due to the insufficient water-shedding property of the FEP, and continuous ejecting could not be performed for 30 minutes. This indicates that idle ejecting and wiping are required in the continuous ejecting mode, with the interval of less than 30 minutes.

Evaluation: Medium Quality

[Ejection Test 8]

The nozzle upper plate used in this ejection test 8 was made of the polyether sulfon resin plate having a reflection factor of 92% including the regular reflecting component and 74.7% without it. One side of this polyether sulfon resin plate was protected by application of a resist, and the other side was coated with 11 mN/m of perfluoroalkyl silane solution (by NI Material; INT444). This perfluoroalkyl silane solution was heated at 300 degrees Celsius to form a siloxane network, thereby forming a water-shedding process layer. This water-shedding process layer had a forward contact angle θf 80 degrees, and a backward contact angle θf 42 degrees. An inlet having a diameter of 26 microns was formed on this polyether sulfon resin plate, using an excimer laser.

With the interval between the recording head and recording medium kept at 1 mm, the recording medium was exposed to the ultraviolet rays from the ultraviolet irradiation apparatus, and 5 pl of ink particles were ejected from the recording head at a speed of 8 m per second at a ejection frequency of 12 kHz for one minute and were suspended for one minute repeatedly (ejecting on an intermittent basis), and this operation was conducted for a total of 30 minutes. In the ink ejection suspension mode, the voltage waveform that did not allow ink to be ejected was applied to the piezoelectric devices to cause micro-vibration of ink meniscus in the ink outlet.

As a result, ink was normally ejected in the initial stage of ejection, but image density was gradually reduced thereafter. It can be considered to have been caused by the following reasons: Since the ultraviolet ray absorbency index was less than 80%, and ultraviolet rays could not absorbed sufficiently. Even if micro-vibration was given to the ink, the ink was thickened by the ultraviolet rays entering the ink outlet, and reduction in the weight of ink particles.

When the recording head was moved to the maintenance unit and ink was ejected in the idle mode, the ejection failure could be remedied but this procedure required frequent suspension of ejection operations.

Evaluation: Poor Quality

The results of the aforementioned tests are summarized in Table 1:

TABLE 1

| | Nozzle upper plate | Water-shedding processing | Distance between head and medium | Ejection mode | Micro-vibration | Evaluation |
|---|---|---|---|---|---|---|
| Ejection test 1 | Polyimide plate (reflection factor: 0.9%) | Perfluoroalkyl silane (γc = 11 mN/m) | 1 mm | Continuous | Not applied | Excellent |
| Ejection test 2 | Polyimide plate | Perfluoroalkyl silane | 1 mm | Intermittent | Applied | Excellent |
| Ejection test 3 | Polyimide plate | Perfluoroalkyl silane | 1 mm | Intermittent | Not applied | Medium |
| Ejection test 4 | Polyimide plate | Perfluoroalkyl silane | 5 mm | Intermittent | Applied | Medium |
| Ejection test 5 | Polyimide plate | Perfluoroalkyl silane | 1 mm | Continuous to suspended | Applied | Excellent |
| Ejection test 6 | Polyimide plate | Perfluoroalkyl silane | 1 mm | Continuous to suspended | Not applied to applied | Excellent |
| Ejection test 7 | Polyimide plate | FEP (γc = 18 mN/m) | 1 mm | Continuous | Not applied | Medium |
| Ejection test 8 | Polyether sulfon resin plate (reflection factor: 74.7%) | Perfluoroalkyl silane | 1 mm | Intermittent | Applied | Poor |

What is claimed is:

1. An inkjet printer comprising:

a recording head provided with an ink nozzle for ejecting ink to a recording medium, the ink being cured by exposure to ultraviolet rays;

an ultraviolet irradiation apparatus for applying ultraviolet rays to the ink ejected on the recording medium; and a light trap which is made of an inverted U-shaped member, and is arranged between the recording head and the ultraviolet irradiation apparatus to prevent the recording head from being exposed to reflected ultraviolet rays emitted from the ultraviolet irradiation apparatus, wherein the light trap has an inorganic ultraviolet ray absorbent coated layer arranged on an ultraviolet ray receiving surface.

2. The inkjet printer of claim 1, wherein the light trap is further provided with a black-color processed layer on the surface of receiving the ultraviolet rays, and the inorganic ultraviolet ray absorbent coated layer is provided on the black-color processed layer.

3. The inkjet printer of claim 1, wherein the inorganic ultraviolet ray absorbent comprises cerium oxide.

4. The inkjet printer of claim 1, wherein the ultraviolet ray receiving surface has a plurality of projections and depressions.

5. The inkjet printer of claim 4, wherein the plurality of projections and depressions are shaped irregularly.

6. The inkjet printer of claim 1, wherein an ultraviolet ray source of the ultraviolet irradiation apparatus is any one of a low pressure mercury lamp, a high pressure mercury lamp, a metal halide lamp, a hot-cathode tube, a cold-cathode tube and an LED.

7. An inkjet printer comprising:

a recording head provided with an ink nozzle for ejecting ink to a recording medium, the ink being cured by exposure to ultraviolet rays;

an ultraviolet irradiation apparatus for applying ultraviolet rays to the ink ejected on the recording medium; and a light trap which is made of an inverted U-shaped member, and is arranged between the recording head and the ultraviolet irradiation apparatus to prevent the recording head from being exposed to reflected ultraviolet rays emitted from the ultraviolet irradiation apparatus, wherein the light trap is provided with a black-color processed layer containing an inorganic ultraviolet ray absorbent, arranged on an ultraviolet ray receiving surface.

8. The inkjet printer of claim 7, wherein the inorganic ultraviolet ray absorbent comprises cerium oxide.

9. The inkjet printer of claim 7, wherein the ultraviolet ray receiving surface has a plurality of projections and depressions.

10. The inkjet printer of claim 9, wherein the plurality of projections and depressions are shaped irregularly.

11. The inkjet printer of claim 7, wherein an ultraviolet ray source of the ultraviolet irradiation apparatus is any one of a low pressure mercury lamp, a high pressure mercury lamp, a metal halide lamp, a hot-cathode tube, a cold-cathode tube and an LED.

12. An inkjet printer comprising:

a recording head having a nozzle upper plate arranged with a nozzle for ejecting ink onto a recording medium, the ink being cured by exposure to ultraviolet rays; and an ultraviolet irradiation apparatus for applying ultraviolet rays to the ink ejected on the recording medium;

wherein an inorganic ultraviolet ray absorbent coated layer and a water-shedding process layer are provided on a surface of the nozzle upper plate, and wherein a black-colored processing layer is further provided between the surface of the nozzle upper plate and layers of the inorganic ultraviolet ray absorbent coated layer and the water-shedding process layer.

13. The inkjet printer of claim 12, wherein the inorganic ultraviolet ray absorbent comprises cerium oxide.

14. The inkjet printer of claim 12, wherein the nozzle upper plate is made of aluminum plate or aluminum die-cast plate.

15. The inkjet printer of claim 12, wherein an ultraviolet ray source of the ultraviolet irradiation apparatus is any one of a low pressure mercury lamp, a high pressure mercury lamp, a metal halide lamp, a hot-cathode tube, a cold-cathode tube and an LED.

16. The inkjet printer of claim 12, an ultraviolet irradiation apparatus for applying wherein critical surface tension on a surface of the nozzle upper plate is lower than surface tension of the ink, and ultraviolet ray absorbency index of the nozzle upper plate is 80% or more.

17. The inkjet printer of claim 16, wherein distance between the surface of the nozzle upper plate and the recording medium is not less than 1 mm and not more than 4 mm.

18. The inkjet printer of claim 16, wherein an ultraviolet ray source of the ultraviolet irradiation apparatus is any one of a low pressure mercury lamp, a high pressure mercury lamp, a metal halide lamp, a hot-cathode tube, a cold-cathode tube and an LED.

19. The inkjet printer of claim 16, wherein the recording head comprises:

an ink flow path for leading the ink to the ink nozzle; and a piezoelectric element for ejecting the ink from the ink flow path;

wherein the piezoelectric element causes micro-vibration of the ink meniscus on the ink nozzle by applying piezoelectric waveform that does not allow the ink to be ejected during the suspension of the ink ejecting, so that the ink in the ink flow path is agitated.

20. An inkjet printer comprising:

a recording head having a nozzle upper plate arranged with a nozzle for ejecting ink onto a recording medium, the ink being cured by exposure to ultraviolet rays; and an ultraviolet irradiation apparatus for applying ultraviolet rays to the ink ejected on the recording medium;

wherein provided on a surface of the nozzle upper plate is a water-shedding process layer containing an inorganic ultraviolet ray absorbent, the water-shedding process layer being formed by coating a water-shedding process liquid containing an inorganic ultraviolet ray absorbent.

21. The inkjet printer of claim 20, wherein the inorganic ultraviolet ray absorbent comprises cerium oxide.

22. The inkjet printer of claim 20, wherein the nozzle upper plate is made of aluminum plate or aluminum die-cast plate.

23. The inkjet printer of claim 20, wherein an ultraviolet ray source of the ultraviolet irradiation apparatus is any one of a low pressure mercury lamp, a high pressure mercury lamp, a metal halide lamp, a hot-cathode tube, a cold-cathode tube and an LED.

24. An inkjet printer comprising:

a recording head having a nozzle upper plate arranged with a nozzle for ejecting ink onto a recording medium, and having a protection upper plate on the nozzle upper plate, the ink being cured by exposure to ultraviolet rays; and an ultraviolet irradiation apparatus for applying ultraviolet rays to the ink ejected on the recording medium;

wherein critical surface tension on a surface of the protection upper plate is lower than surface tension of the ink, and ultraviolet ray absorbency index of the protection upper plate is 80% or more.

25. The inkjet printer of claim 24, wherein critical surface tension on a surface of the nozzle upper plate is lower than surface tension of the ink, and ultraviolet ray absorbency index of the nozzle upper plate is 80% or more.

26. The inkjet printer of claim 25, wherein the critical surface tension on the surface of at least one of the nozzle upper plate and the protection upper plate is not greater than 15 mN/m.

27. The inkjet printer of claim 25, wherein at least one of the nozzle upper plate surface and the protection upper plate surface is formed with an inorganic ultraviolet ray absorbent coated layer and a water-shedding process layer provided on a substrate.

28. The inkjet printer of claim 27, wherein at least one of the nozzle upper plate surface and protection upper plate surface is provided with a black-color processed layer formed on the substrate, and the inorganic ultraviolet ray absorbent coated layer and the water-shedding process layer are provided on the black-color processed layer.

29. The inkjet printer of claim 27, wherein at least one of the substrates of nozzle upper plate and protection upper plate is made of aluminum plate or aluminum die-cast plate.

30. The inkjet printer of claim 25, wherein the surface of the nozzle upper plate is provided with a water-shedding process layer formed on a substrate of the nozzle upper plate, and a substrate of the protection upper plate is made of material having an ultraviolet ray absorbency index of 80% or more.

31. An inkjet recording head for ejecting ink onto a recording medium, the ink being cured by exposure to ultraviolet rays, the inkjet recording head comprising:

a nozzle upper plate arranged with a nozzle for ejecting ink;

wherein an inorganic ultraviolet ray absorbent coated layer and a water-shedding process layer are provided on a surface of the nozzle upper plate, wherein a black-colored processing layer is further provided between the surface of the nozzle upper plate and layers of the inorganic ultraviolet ray absorbent coated layer and the water-shedding process layer, and wherein critical surface tension on a surface of the nozzle upper plate is lower than surface tension of the ink, and ultraviolet ray absorbency index of the nozzle upper plate is 80% or more.

32. The inkjet head of claim 31, wherein distance between the surface of the nozzle upper plate and the recording medium is not less than 1 mm and not more than 4 mm.

33. The inkjet head of claim 31, further comprising:

an ink flow path for leading the ink to the ink nozzle; and a piezoelectric element for ejecting the ink from the ink flow path;

wherein the piezoelectric element causes micro-vibration of the ink meniscus on the ink nozzle by applying piezoelectric waveform that does not allow the ink to be ejected during the suspension of ink ejecting, so that the ink in the ink flow path is agitated.

34. An inkjet recording head for ejecting ink onto a recording medium, the ink being cured by exposure to ultraviolet rays, the inkjet recording head comprising:

a nozzle upper plate arranged with a nozzle for ejecting ink; and a protection upper plate for protecting the nozzle upper plate;

wherein the critical surface tension on the surface of the protection upper plate is lower than the surface tension of the ink, and ultraviolet ray absorbency index of the protection upper plate is 80% or more.

35. The inkjet recording head of claim 34, wherein critical surface tension on a surface of the nozzle upper plate is lower than surface tension of the ink, and ultraviolet ray absorbency index of the nozzle upper plate is 80% or more.

36. The inkjet head of claim 35, wherein the critical surface tension on the surface of at least one of the nozzle upper plate and the protection upper plate is not greater than 15 mN/m.

37. The inkjet head of claim 36, wherein at least one of the substrates of nozzle upper plate and protection upper plate is made of aluminum plate or aluminum die-cast plate.

38. The inkjet head of claim 35, wherein at least one of the nozzle upper plate surface and the protection upper plate surface is formed with an inorganic ultraviolet ray absorbent coated layer and a water-shedding process layer provided on a substrate.

39. The inkjet head of claim 38, wherein at least one of the nozzle upper plate surface and protection upper plate surface is provided with a black-color processed layer formed on the substrate, and the inorganic ultraviolet ray absorbent coated layer and the water-shedding process layer are provided on the black-color processed layer.

40. The inkjet head of claim 35, wherein the surface of the nozzle upper plate is provided with a water-shedding process layer formed on a substrate of the nozzle upper plate, and a substrate of the protection upper plate is made of material having an ultraviolet ray absorbency index of 80% or more.

* * * * *